US012732728B2

(12) United States Patent
Huo et al.

(10) Patent No.: US 12,732,728 B2
(45) Date of Patent: Sep. 8, 2026

(54) DISPLAY DEVICE AND AUDIO OUTPUT METHOD THEREOF

(71) Applicant: HUAWEI TECHNOLOGIES CO., LTD., Shenzhen (CN)

(72) Inventors: Peng Huo, Dongguan (CN); An Wang, Shenzhen (CN); Qiang Zhang, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 183 days.

(21) Appl. No.: 18/286,658

(22) PCT Filed: Apr. 6, 2022

(86) PCT No.: PCT/CN2022/085410
§ 371 (c)(1),
(2) Date: Oct. 12, 2023

(87) PCT Pub. No.: WO2022/218195
PCT Pub. Date: Oct. 20, 2022

(65) Prior Publication Data

US 2024/0196123 A1 Jun. 13, 2024

(30) Foreign Application Priority Data

Apr. 13, 2021 (CN) ........................ 202110396109.1

(51) Int. Cl.
*H04R 1/02* (2006.01)
*H04N 5/64* (2006.01)

(52) U.S. Cl.
CPC ............ *H04R 1/028* (2013.01); *H04N 5/642* (2013.01)

(58) Field of Classification Search
CPC ...................................................... H04R 1/028
USPC .................................................. 381/333, 388
See application file for complete search history.

(56) References Cited

U.S. PATENT DOCUMENTS

| | | | | |
|---|---|---|---|---|
| 6,175,489 | B1 * | 1/2001 | Markow | H04R 5/02 381/87 |
| 6,359,994 | B1 * | 3/2002 | Markow | G06F 1/1632 381/388 |
| 8,494,186 | B2 * | 7/2013 | Lee | H04R 1/26 381/388 |
| 10,863,276 | B2 * | 12/2020 | Walther | H04R 3/12 |
| 2006/0008103 | A1 * | 1/2006 | Takahashi | H04R 5/02 381/388 |

(Continued)

FOREIGN PATENT DOCUMENTS

| | | | |
|---|---|---|---|
| CN | 101146372 | A | 3/2008 |
| CN | 111757171 | A | 10/2020 |
| CN | 112153538 | A | 12/2020 |

*Primary Examiner* — Suhan Ni

(74) *Attorney, Agent, or Firm* — WOMBLE BOND DICKINSON (US) LLP

(57) ABSTRACT

This application provides a display device and an audio output method thereof. The display device includes a display, a first speaker, and a second speaker. The first speaker is disposed on a rear side of the display. A sound emitting direction of the first speaker faces toward space in rear of and above the display device. A sound emitting direction of the second speaker faces toward space in front of the display device or faces toward space below the display device. The first speaker and the second speaker emit sounds asynchronously. A stereo effect of the display device in this application is good.

19 Claims, 10 Drawing Sheets

(56) References Cited

U.S. PATENT DOCUMENTS

| | | | | |
|---|---|---|---|---|
| 2007/0274547 | A1* | 11/2007 | Ueno | H04R 5/02 381/388 |
| 2009/0196440 | A1 | 8/2009 | Suzuki | |
| 2012/0219173 | A1* | 8/2012 | Yukawa | H04R 1/025 381/388 |

* cited by examiner

DISPLAY DEVICE AND AUDIO OUTPUT METHOD THEREOF

CROSS-REFERENCE TO RELATED APPLICATIONS

This application is a national stage of International Application No. PCT/CN2022/085410, filed on Apr. 6, 2022, which claims priority to Chinese Patent Application No. 202110396109.1, filed on Apr. 13, 2021. The disclosures of the aforementioned applications are hereby incorporated by reference in their entireties.

TECHNICAL FIELD

This application relates to the field of television devices, and in particular, to a display device and an audio output method thereof.

BACKGROUND

An existing video play device, such as a flat-panel television, has at least two speakers for implementing a stereo effect. However, the stereo effect of the existing video play device is not good.

SUMMARY

Embodiments of this application provide a display device, to obtain a display device with a good stereo effect. Embodiments of this application further provide an audio output method for a display device, to improve a stereo effect of the display device.

According to a first aspect, a display device is provided. The display device includes a display, a first speaker, and a second speaker. The first speaker is disposed on a rear side of the display, and a sound emitting direction of the first speaker faces toward space in rear of and above the display device. A sound emitting direction of the second speaker faces toward space in front of the display device or faces toward space below the display device. The first speaker and the second speaker emit sounds asynchronously.

It may be understood that the sound emitting direction of the first speaker is an initial propagation direction of a sound emitted by the first speaker, and the space in rear of and above the display device is a direction between space in rear of the display device and space above the display device.

In this application, the first speaker and the second speaker are controlled to emit the sounds asynchronously, so that a user can simultaneously receive the sound emitted by the first speaker and the sound emitted by the second speaker. A position of a sound image formed by the sound emitted by the first speaker and the sound emitted by the second speaker is more accurate, and a position deviation between a picture and the position of the sound image does not occur, so that the position of the sound image and the picture are accurately synchronized, a stereo effect is good, and user experience is improved.

In an embodiment, the sound emitted by the first speaker is reflected by a first obstacle located in rear of the display device to a second obstacle located above the display device, and is reflected by the second obstacle to a user viewing area in front of the display device. The first obstacle may be a wall, and the second obstacle may be a ceiling.

The sound emitting direction of the first speaker faces toward the space in rear of and above the display device. In other words, an axial direction of the first speaker faces toward the space in rear of and above the display device. Because the axial direction of the first speaker faces toward the space in rear of and above the display device, most sound of the first speaker faces toward the first obstacle located in rear of the display device. After being reflected by the first obstacle, the sound is reflected by the second obstacle located above the display device to the user viewing area. A small portion of the sound of the first speaker deviates greatly from the axial direction, and can face toward space directly in front of the display device and directly arrive at the user viewing area. However, this portion of the sound has a large axial deviation angle from the main axial direction of the first speaker, and sound intensity is weak. Therefore, the sound that directly arrives at the user viewing area has a weak shielding effect on the sound that arrives at the user viewing area after being reflected twice by the wall and the ceiling, an overhead sound image positioning effect of the sound that arrives at the user viewing area after being reflected by the ceiling is good, and audio-visual experience of the user is improved.

In addition, the sound emitted by the first speaker is reflected by the first obstacle to the second obstacle, and then is projected to the user viewing area after being reflected by the ceiling. A sound image of the sound transmitted to the user viewing area is a sound image located above the ceiling. In this way, a sound field range that is in a height direction and that is formed by the first speaker is not limited to a size of the display, so that a sound field in the height direction can cover an entire spatial height of an application environment, to achieve an overhead sound image positioning effect. For example, a sound image of an aircraft engine can be positioned at a position above the display, and is played by using the first speaker, so that a picture played by the display is consistent with sound positioning.

In an embodiment, the sound emitting direction of the first speaker is at an angle of 10 degrees to 80 degrees (including 10 degrees and 80 degrees) relative to a horizontal direction, to ensure that the sound emitted by the first speaker is sequentially reflected by the wall and the ceiling, and finally arrives at the user viewing area. The horizontal direction is a direction perpendicular to a display surface of the display.

In an embodiment, the sound emitting direction of the first speaker is at an angle of 35 degrees to 45 degrees (including 35 degrees and 45 degrees) relative to the horizontal direction. When the sound emitting direction of the first speaker is at an angle of 35 degrees to 45 degrees relative to the horizontal direction, the display device is applicable to a plurality of application environments with different spatial parameters. When the display device is used in the plurality of application environments with different spatial parameters, the sound emitted by the first speaker can be sequentially reflected by walls and ceilings in different application environments, and finally arrive at the user viewing area. The spatial parameter is a set of a plurality of different parameters, for example, a distance between the display device and the wall, a distance between the display device and the ceiling, and a distance between the display device and the user. In other words, the display device can be used in a plurality of application environments with different spatial parameters within a distance range from the wall, a distance range from the ceiling, and a distance range from the user, to ensure audio-visual experience of the user.

In an embodiment, the first speaker emits a first sound at a first moment, the second speaker emits a second sound corresponding to the first sound at a second moment, and the first sound mixes with the second sound in the user viewing area. There is a time difference between the first moment and the second moment. The first speaker is controlled to emit the sound at the first moment, and the second speaker is controlled to emit the sound at the second moment, so that the user can simultaneously receive, at the third moment, the sound emitted by the first speaker and the sound emitted by the second speaker. Sound image positioning is more accurate, and a position deviation between the picture and the position of the sound image does not occur, so that the position of the sound image and the picture are accurately synchronized, and user experience is improved.

In an embodiment, when the spatial parameter of the application environment of the display device changes, the time difference between the first moment and the second moment changes, to ensure that sound emitted by the first speaker and the sound emitted by the second speaker simultaneously arrive at the user viewing area. In this way: sound image positioning is more accurate.

In an embodiment, when a volume ratio between the first sound and the second sound changes, the position of the sound image formed by the first sound and the second sound changes. The position of the sound image formed by the first sound and the second sound is adjusted by adjusting the volume ratio between the first sound and the second sound, so that the position of the sound image is adjusted in the height direction, and the position of the sound image and the picture are synchronized.

In an embodiment, the sound emitting direction of the first speaker is variable, and the first speaker may adjust the sound emitting direction as required, so that the sound emitted by the first speaker can be accurately transmitted to the user viewing area.

In an embodiment, when the spatial parameter of the application environment of the display device changes, the sound emitting direction of the first speaker is variable. The sound emitting direction of the first speaker is adjusted by using the spatial parameter, to implement automatic adjustment of the sound emitting direction of the first speaker, and improve user experience.

In an embodiment, the spatial parameter includes at least one of a first distance, a second distance, and a third distance, the first distance is a distance between the display device and the first obstacle, the second distance is a distance between the display device and the second obstacle, and the third distance is a distance between the display device and the user. The display device may adjust a position of the user viewing area based on a position of the user, so that the user can have good audio-visual experience regardless of a position the user moves to.

In an embodiment, the display device includes a top and a bottom, and the second speaker is disposed closer to the bottom compared with the first speaker, so that the user receives a combined sound formed by the sounds emitted by the speakers at different positions, to improve a stereoscopic sense of the sound.

In an embodiment, the display device further includes a processor, and the processor is coupled to both the first speaker and the second speaker. The processor adjusts, by controlling the volume ratio between the first sound emitted by the first speaker and the second sound emitted by the second speaker, the position of the sound image formed by the first sound and the second sound, so that the position of the sound image is adjusted in the height direction, and the position of the sound image and the picture are synchronized.

In an embodiment, the processor is further configured to control the first speaker to emit the first sound at the first moment, control the second speaker to emit the second sound at the second moment, and the user simultaneously or almost simultaneously receives the first sound and the second sound at the third moment, where there is a time difference between the first moment and the second moment. The first speaker is controlled to emit the sound at the first moment, and the second speaker is controlled to emit the sound at the second moment, so that the user can simultaneously receive, at the third moment, the sound emitted by the first speaker and the sound emitted by the second speaker. Sound image positioning is more accurate, and a position deviation between the picture and the position of the sound image does not occur, so that the position of the sound image and the picture are accurately synchronized, and user experience is improved.

In an embodiment, the display device further includes a driving component. The driving component is coupled to the processor. The processor is configured to drive the driving component to adjust the sound emitting direction of the first speaker. The first speaker may adjust the sound emitting direction as required, so that the sound emitted by the first speaker can be accurately transmitted to the user viewing area.

In an embodiment, the display device further includes a distance detector. The distance detector is configured to detect the application environment of the display device and obtain the spatial parameter of the application environment. The sound emitting direction of the first speaker changes in response to the change of the spatial parameter, to implement automatic adjustment of the sound emitting direction of the first speaker, and improve user experience.

In an embodiment, the distance detector is coupled to the processor. The distance detector sends an instruction to the processor. The time difference between the first moment and the second moment changes in response to the instruction, to ensure that the sound emitted by the first speaker and the sound emitted by the second speaker simultaneously arrive at the user viewing area, and sound image positioning is more accurate.

In an embodiment, the distance detector includes a radar. The radar obtains more accurate data than other detectors.

In an embodiment, the display device further includes a sensing sensor, that is, a sensor that senses that the display device is moved or senses that a position of the display device changes. For example, the sensing sensor may be a gyroscope, an accelerometer, or the like. After detecting that the position of the display device changes, the sensing sensor may trigger the distance detector to detect the spatial parameter of the application environment, so that the first speaker adjusts the sound emitting direction based on the spatial parameter. Therefore, the distance detector obtains the spatial parameter of the application environment provided that the position of the display device changes, so that the first speaker adjusts the sound emitting direction based on the spatial parameter, to ensure audio-visual experience of the user at all times.

In an embodiment, the first speaker is located between a midpoint that is between the top and the bottom and the top. To be specific, the first speaker is located at a position below the top, so that the sound that is emitted by the first speaker and that faces toward the space directly in front of the display device is blocked by the housing of the display device, the sound that is directly transmitted from the first speaker to the user viewing area is effectively reduced, and overhead sound image positioning is more accurate.

In an embodiment, the second speaker is disposed at the bottom and/or disposed at a side of the display device.

According to a second aspect, an audio output method for a display device is provided. The display device includes a display, a first speaker, and a second speaker. The first speaker emits a sound to space in rear of and above the display device. A sound emitting direction of the second speaker faces toward space in front of the display device or faces toward space below the display device. The audio output method includes:

The first speaker receives first audio information, and the second speaker receives second audio information corresponding to the first audio information. A play time of the first audio information is asynchronous with a play time of the second audio information.

According to the audio output method in this application, the first speaker is controlled to emit the sound at a first moment, and the second speaker is controlled to emit a sound at a second moment, so that a user can simultaneously receive, at a third moment, the sound emitted by the first speaker and the sound emitted by the second speaker, a stereo effect is good, and user experience is improved.

In an embodiment, the sound emitted by the first speaker is reflected by a first obstacle located in rear of the display device to a second obstacle located above the display device, and is reflected by the second obstacle to a user viewing area in front of the display device. A sound emitting direction of the first speaker faces toward the space in rear of and above the display device. A sound that is reflected by a ceiling and arrives at the user viewing area has a good overhead sound image positioning effect, and audio-visual experience of the user is improved.

In an embodiment, the audio output method includes: The first speaker emits a first sound at the first moment after receiving the first audio information. The second speaker emits a second sound corresponding to the first sound at the second moment after receiving the second audio information. The first sound mixes with the second sound in the user viewing area. There is a time difference between the first moment and the second moment.

In an embodiment, the first speaker is controlled to emit the sound at the first moment, and the second speaker is controlled to emit the sound at the second moment, so that the user can simultaneously receive, at the third moment, the sound emitted by the first speaker and the sound emitted by the second speaker. Sound image positioning is more accurate, and a position deviation between a picture and the position of the sound image does not occur, so that the position of the sound image and the picture are accurately synchronized, and user experience is improved.

In an embodiment, when a volume ratio between the first sound and the second sound changes, a position of a sound image formed by the first sound and the second sound changes. In other words, a volume ratio between the first audio information and the second audio information may be adjusted, so that the position of the sound image and the picture are synchronized, and a real three-dimensional spatial sound field sound effect is implemented.

In an embodiment, the audio output method further includes: detecting an application environment of the display device, and obtaining a spatial parameter of the application environment. The sound emitting direction of the first speaker changes in response to the change of the spatial parameter.

It may be understood that, in the audio output method in an embodiment, the sound emitting direction of the first speaker may be adjusted based on the application environment of the display device. When the display device is used for the first time, or the display device is moved to a new application environment, the display device detects a spatial parameter of the application environment by using a distance detector. Then, the sound emitting direction of the first speaker is adjusted by using the spatial parameter, so that the display device can ensure that in different application environments, the sound emitted by the first speaker is accurately transmitted to the user viewing area after being reflected, to improve audio-visual experience of the user.

In an embodiment, the audio output method further includes: detecting an application environment of the display device, and obtaining a spatial parameter of the application environment. The time difference between the first moment and the second moment changes in response to a change of the spatial parameter, to ensure that the sound emitted by the first speaker and the sound emitted by second speaker simultaneously arrive at the user viewing area, and sound image positioning is more accurate.

In an embodiment, the spatial parameter includes at least one of a first distance, a second distance, and a third distance. The first distance is a distance between the display device and the first obstacle. The second distance is a distance between the display device and the second obstacle. The third distance is a distance between the display device and the user.

In an embodiment, according to the audio output method, a movement status of the display device can further be sensed at all times. The movement status includes being moved and changes in position. After a position of the display device changes, the distance detector is triggered to detect the spatial parameter of the application environment, and the sound emitting direction of the first speaker is adjusted based on the spatial parameter. Therefore, the distance detector obtains the spatial parameter of the application environment provided that the position of the display device changes, so that the first speaker adjusts the sound emitting direction based on the spatial parameter, to ensure audio-visual experience of the user at all times.

According to a third aspect, a display device is provided. The display device includes a display, a first speaker, and a second speaker. The first speaker is disposed on a rear side of the display. A sound emitting direction of the first speaker faces toward space in rear of and above the display device. A sound emitting direction of the second speaker is different from the sound emitting direction of the first speaker.

The sound emitting direction of the second speaker in this application is different from the sound emitting direction of the first speaker, so that a user can receive sounds from different directions, to improve a stereoscopic sense of the sound.

In an embodiment, the sound emitted by the first speaker is reflected by a first obstacle located in rear of the display device to a second obstacle located above the display device, and is reflected by the second obstacle to a user viewing area in front of the display device. The first obstacle may be a wall, and the second obstacle may be a ceiling.

The sound emitting direction of the first speaker faces toward the space in rear of and above the display device. In other words, an axial direction of the first speaker faces toward the space in rear of and above the display device. Because the axial direction of the first speaker faces toward the space in rear of and above the display device, most sound of the first speaker faces toward the first obstacle located in rear of the display device. After being reflected by the first obstacle, the sound is reflected by the second obstacle located above the display device to the user viewing area. A small portion of the sound of the first speaker deviates greatly from the axial direction, and can face toward space directly in front of the display device and directly arrive at the user viewing area. However, this portion of the sound has a large axial deviation angle from the main axial direction of the first speaker, and sound intensity is weak. Therefore, the sound that directly arrives at the user viewing area has a weak shielding effect on the sound that arrives at the user viewing area after being reflected twice by the wall and the ceiling, an overhead sound image positioning effect of the sound that arrives at the user viewing area after being reflected by the ceiling is good, and audio-visual experience of the user is improved.

In addition, the sound emitted by the first speaker is reflected by the first obstacle to the second obstacle, and then is projected to the user viewing area after being reflected by the ceiling. A sound image of the sound transmitted to the user viewing area is a sound image located above the ceiling. In this way, a sound field range that is in a height direction and that is formed by the first speaker is not limited to a size of the display, so that a sound field in the height direction can cover an entire spatial height of an application environment, to achieve an overhead sound image positioning effect. For example, a sound image of an aircraft engine can be positioned at a position above the display, and is played by using the first speaker, so that a picture played by the display is consistent with sound positioning.

In an embodiment, the sound emitting direction of the first speaker is at an angle of 10 degrees to 80 degrees (including 10 degrees and 80 degrees) relative to a horizontal direction, to ensure that the sound emitted by the first speaker is sequentially reflected by the wall and the ceiling, and finally arrives at the user viewing area. The horizontal direction is a direction perpendicular to a display surface of the display.

In an embodiment, the sound emitting direction of the first speaker is variable, so that the first speaker may adjust the sound emitting direction as required, and the sound emitted by the first speaker can be accurately transmitted to the user viewing area.

In an embodiment, when a spatial parameter of the application environment of the display device changes, the sound emitting direction of the first speaker is variable. The sound emitting direction of the first speaker is adjusted by using the spatial parameter, to implement automatic adjustment of the sound emitting direction of the first speaker, and improve user experience.

According to a fourth aspect, a display device is provided. The display device includes a display, a first speaker, and a second speaker. The first speaker is disposed on a rear side of the display: A sound emitting direction of the first speaker faces toward space in rear of and above the display device. The sound emitting direction of the first speaker is variable. The first speaker may adjust the sound emitting direction as required, so that a sound emitted by the first speaker can be accurately transmitted to a user viewing area.

In an embodiment, the sound emitted by the first speaker is reflected by a first obstacle located in rear of the display device to a second obstacle located above the display device, and is reflected by the second obstacle to the user viewing area in front of the display device. The first obstacle may be a wall, and the second obstacle may be a ceiling.

The sound emitting direction of the first speaker faces toward the space in rear of and above the display device. In other words, an axial direction of the first speaker faces toward the space in rear of and above the display device. Because the axial direction of the first speaker faces toward the space in rear of and above the display device, most sound of the first speaker faces toward the first obstacle located in rear of the display device. After being reflected by the first obstacle, the sound is reflected by the second obstacle located above the display device to the user viewing area. A small portion of the sound of the first speaker deviates greatly from the axial direction, and can face toward space directly in front of the display device and directly arrive at the user viewing area. However, this portion of the sound has a large axial deviation angle from the main axial direction of the first speaker, and sound intensity is weak. Therefore, the sound that directly arrives at the user viewing area has a weak shielding effect on the sound that arrives at the user viewing area after being reflected twice by the wall and the ceiling, an overhead sound image positioning effect of the sound that arrives at the user viewing area after being reflected by the ceiling is good, and audio-visual experience of a user is improved.

In addition, the sound emitted by the first speaker is reflected by the first obstacle to the second obstacle, and then is projected to the user viewing area after being reflected by the ceiling. A sound image of the sound transmitted to the user viewing area is a sound image located above the ceiling. In this way, a sound field range that is in a height direction and that is formed by the first speaker is not limited to a size of the display, so that a sound field in the height direction can cover an entire spatial height of an application environment, to achieve an overhead sound image positioning effect. For example, a sound image of an aircraft engine can be positioned at a position above the display, and is played by using the first speaker, so that a picture played by the display is consistent with sound positioning.

In an embodiment, when a spatial parameter of the application environment of the display device changes, the sound emitting direction of the first speaker is variable. The sound emitting direction of the first speaker is adjusted by using the spatial parameter, to implement automatic adjustment of the sound emitting direction of the first speaker, and improve user experience.

In an embodiment, the spatial parameter includes at least one of a first distance, a second distance, and a third distance. The first distance is a distance between the display device and the first obstacle. The second distance is a distance between the display device and the second obstacle. The third distance is a distance between the display device and the user.

In an embodiment, when a volume ratio between a first sound and a second sound changes, a position of a sound image formed by the first sound and the second sound changes. The position of the sound image formed by the first sound and the second sound is adjusted by adjusting the volume ratio between the first sound and the second sound, so that the position of the sound image is adjusted in the height direction, and the position of the sound image and the picture are synchronized.

In an embodiment, the first speaker emits the first sound at a first moment, the second speaker emits the second sound corresponding to the first sound at a second moment, and the first sound mixes with the second sound in the user viewing area. There is a time difference between the first moment and the second moment. The first speaker is controlled to emit the sound at the first moment, and the second speaker is controlled to emit the sound at the second moment, so that the user can simultaneously receive, at a third moment, the sound emitted by the first speaker and the sound emitted by the second speaker. Sound image positioning is more accurate, and a position deviation between the picture and the position of the sound image does not occur, so that the position of the sound image and the picture are accurately synchronized, and user experience is improved.

In an embodiment, when the spatial parameter of the application environment of the display device changes, the time difference between the first moment and the second moment changes, to ensure that sound emitted by the first speaker and the sound emitted by the second speaker simultaneously arrive at the user viewing area. In this way, sound image positioning is more accurate.

In an embodiment, when the first speaker is located in a first sound emitting direction, the time difference between the first moment and the second moment is a first time difference. When the first speaker is located in a second sound emitting direction, the time difference between the first moment and the second moment is a second time difference. The first time difference is different from the second time difference. The time difference between the first moment and the second moment may be obtained by using data such as the sound emitting direction of the first speaker.

According to a fifth aspect, a display device is provided. The display device includes a display and a first speaker. The first speaker is disposed on a rear side of the display. A sound emitting direction of the first speaker faces toward space in rear of and above the display device. A sound emitted by the first speaker is reflected by a first obstacle located in rear of the display device to a second obstacle located above the display device, and is reflected by the second obstacle to a user viewing area in front of the display device. The first obstacle may be a wall, and the second obstacle may be a ceiling.

In this application, the sound emitting direction of the first speaker faces toward the space in rear of and above the display device. In other words, an axial direction of the first speaker faces toward the space in rear of and above the display device. Because the axial direction of the first speaker faces toward the space in rear of and above the display device, most sound of the first speaker faces toward the first obstacle located in rear of the display device. After being reflected by the first obstacle, the sound is reflected by the second obstacle located above the display device to the user viewing area. A small portion of the sound of the first speaker deviates greatly from the axial direction, and can face toward space directly in front of the display device and directly arrive at the user viewing area. However, this portion of the sound has a large axial deviation angle from the main axial direction of the first speaker, and sound intensity is weak. Therefore, the sound that directly arrives at the user viewing area has a weak shielding effect on the sound that arrives at the user viewing area after being reflected twice by the wall and the ceiling, an overhead sound image positioning effect of the sound that arrives at the user viewing area after being reflected by the ceiling is good, and audio-visual experience of the user is improved.

In addition, the sound emitted by the first speaker is reflected by the first obstacle to the second obstacle, and then is projected to the user viewing area after being reflected by the ceiling. A sound image of the sound transmitted to the user viewing area is a sound image located above the ceiling. In this way, a sound field range that is in a height direction and that is formed by the first speaker is not limited to a size of the display, so that a sound field in the height direction can cover an entire spatial height of an application environment, to achieve an overhead sound image positioning effect. For example, a sound image of an aircraft engine can be positioned at a position above the display, and is played by using the first speaker, so that a picture played by the display is consistent with sound positioning.

In an embodiment, the sound emitting direction of the first speaker is at an angle of 10 degrees to 80 degrees (including 10 degrees and 80 degrees) relative to a horizontal direction, to ensure that the sound emitted by the first speaker is sequentially reflected by the wall and the ceiling, and finally arrives at the user viewing area. The horizontal direction is a direction perpendicular to a display surface of the display.

In an embodiment, the display device further includes a second speaker, and a sound emitting direction of the second speaker faces toward space in front of the display device or faces toward space below the display device.

In an embodiment, when a volume ratio between a first sound emitted by the first speaker and a second sound emitted by the second speaker changes, a position of a sound image formed by the first sound and the second sound changes. The position of the sound image formed by the first sound and the second sound is adjusted by adjusting the volume ratio between the first sound and the second sound, so that the position of the sound image is adjusted in the height direction, and the position of the sound image and the picture are synchronized.

In an embodiment, the first speaker emits the first sound at a first moment, the second speaker emits the second sound corresponding to the first sound at a second moment, and the first sound mixes with the second sound in the user viewing area. There is a time difference between the first moment and the second moment. The first speaker is controlled to emit the sound at the first moment, and the second speaker is controlled to emit the sound at the second moment, so that the user can simultaneously receive, at a third moment, the sound emitted by the first speaker and the sound emitted by the second speaker. Sound image positioning is more accurate, and a position deviation between the picture and the position of the sound image does not occur, so that the position of the sound image and the picture are accurately synchronized, and user experience is improved.

In an embodiment, when a spatial parameter of the application environment of the display device changes, the time difference between the first moment and the second moment changes, to ensure that sound emitted by the first speaker and the sound emitted by the second speaker simultaneously arrive at the user viewing area. In this way, sound image positioning is more accurate.

In an embodiment, the sound emitting direction of the first speaker is variable, and the first speaker may adjust the sound emitting direction as required, so that the sound emitted by the first speaker can be accurately transmitted to the user viewing area.

In an embodiment, when the spatial parameter of the application environment of the display device changes, the sound emitting direction of the first speaker is variable. The sound emitting direction of the first speaker is adjusted by using the spatial parameter, to implement automatic adjustment of the sound emitting direction of the first speaker, and improve user experience.

In an embodiment, the spatial parameter includes at least one of a first distance, a second distance, and a third distance. The first distance is a distance between the display device and the first obstacle. The second distance is a distance between the display device and the second obstacle. The third distance is a distance between the display device and the user. The display device may adjust a position of the user viewing area based on a position of the user, so that the user can have good audio-visual experience regardless of a position the user moves to.

BRIEF DESCRIPTION OF DRAWINGS

To describe the technical solutions in embodiments of this application or the background more clearly, the following describes the accompanying drawings used in embodiments of this application or the background.

FIG. 6 is a schematic diagram of a structure of a processor, a first speaker, and a second speaker of the display device shown in FIG. 3;

FIG. 7 is a schematic diagram of an audio output processing process of the structure shown in FIG. 6:

DESCRIPTION OF EMBODIMENTS

The following describes embodiments of this application with reference to the accompanying drawings in embodiments of this application.

In the descriptions of embodiments of this application, it should be noted that terms "mount" and "connection" should be understood in a broad sense unless there is a clear stipulation and limitation. For example, "connection" may be a detachable connection, a nondetachable connection, a direct connection, or an indirect connection through an intermediate medium. Orientation terms mentioned in embodiments of this application, for example, "above", "below", "left", "right", "inside", "outside", "front", "rear", are merely directions based on the accompanying drawings. Therefore, the orientation terms are used to better and more clearly describe and understand embodiments of this application, instead of indicating or implying that a specified apparatus or element should have an orientation, and be constructed and operated in the orientation. Therefore, this cannot be understood as a limitation on embodiments of this application. "A plurality of" means at least two.

It may be understood that the embodiments described herein are used to explain a related solution, but are not intended to limit the solution. In addition, it should be further noted that, for ease of description, only a part related to the solution is shown in the accompanying drawings.

This application is described in detail in the following with reference to the accompanying drawings by using embodiments.

An embodiment of this application provides a display device. The display device includes but is not limited to a display device having a speaker, such as a flat-panel television, a computer display: a conference display, or a vehicle display. In this application, an example in which the display device is a flat-panel television is used for description.

Figure 1:
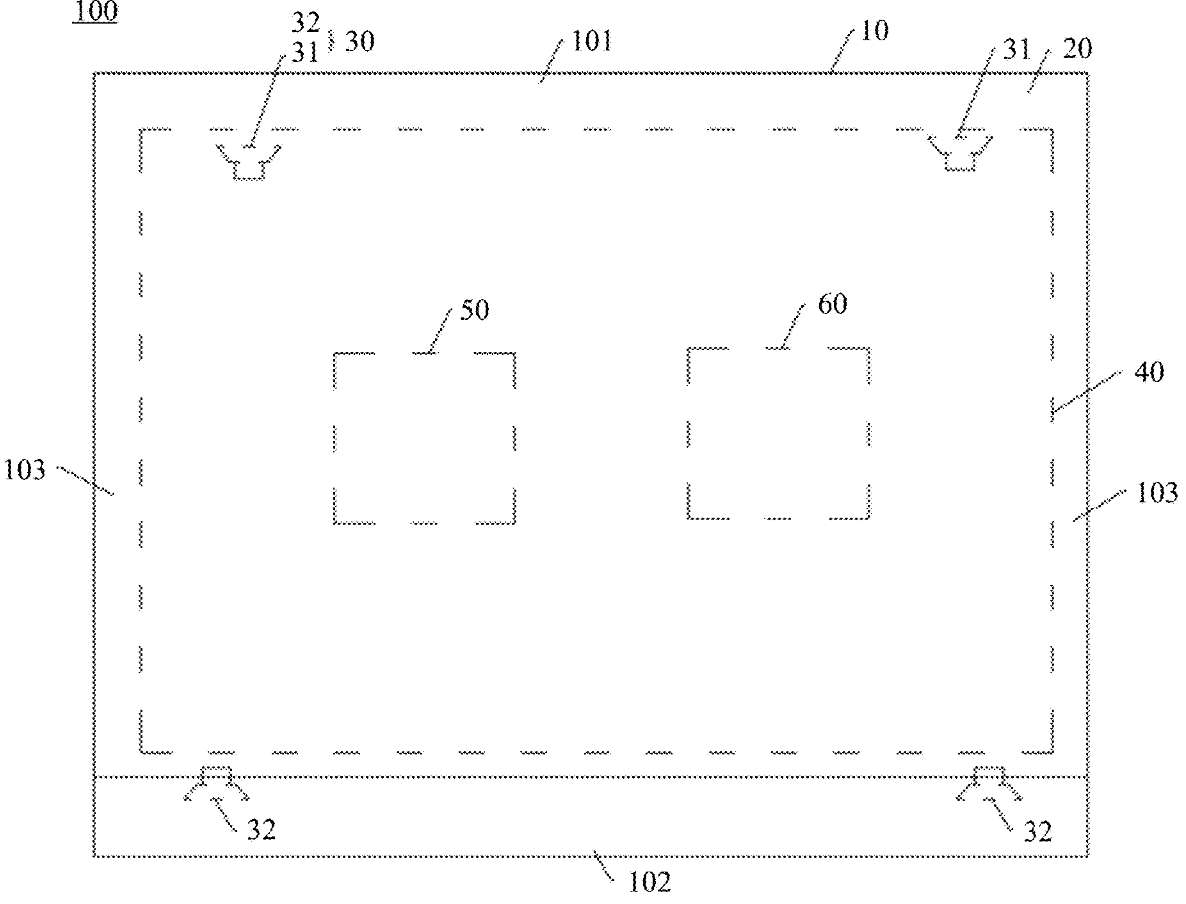
FIG. 1 is a schematic diagram of a structure of a display device according to an embodiment of this application.
Figure 2:
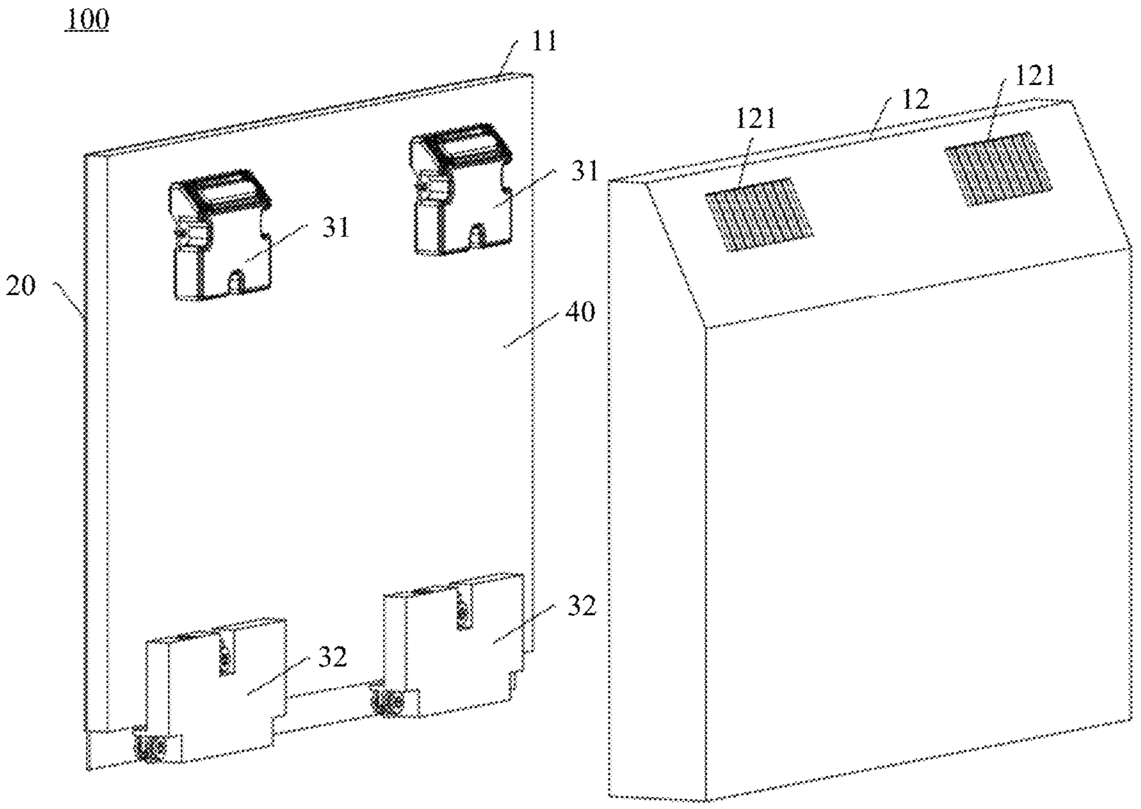
FIG. 2 is a schematic diagram of an exploded structure of the display device shown in FIG. 1 from another angle.

FIG. 1 is a schematic diagram of a structure of a display device according to an embodiment of this application. FIG. 2 is a schematic diagram of an exploded structure of the display device shown in FIG. 1 from another angle.

The display device 100 includes a housing 10, a display 20, a speaker 30, a main board 40, a processor 50, and a memory 60.

The display 20 is configured to display an image, a video, and the like. The display 20 may further integrate a touch function. The display 20 is mounted on the housing 10. The housing 10 may include a frame 11 and a rear housing 12. The display 20 and the rear housing 12 are respectively mounted on two opposite sides of the frame 11. The display 20 is located on a side facing a user, and the rear housing 12 is located on a side that faces away from the user. The display 20 includes a display panel. The display panel may be a liquid crystal display (LCD), an organic light-emitting diode (OLED), an active-matrix organic light emitting diode or an active-matrix organic light emitting diode (AMOLED), a flexible light-emitting diode (FLED), a mini-LED, a micro-LED, a micro-OLED, a quantum dot light emitting diode (QLED), or the like.

In an embodiment, in external space of the display device 100, space that the display 20) faces toward is defined as space in front of the display device 100, and space that the rear housing 12 faces toward is defined as space in rear of the display device 100. The display device 100 includes a top 101, a bottom 102, and two sides 103 that are separately connected between the top 101 and the bottom 102 and that are disposed opposite to each other. A direction that the top 101 of the display device 100 faces toward is defined as space above the display device 100, and a direction that the bottom 102 of the display device 100 faces toward is defined as space below the display device 100.

The main board 40) is located on an inner side of the housing 10, and the main board 40) integrates the processor 50, the memory 60, and other various circuit devices. The display 20 is coupled to the processor 50, to receive a display signal sent by the processor 50. The processor 50 may include one or more processing units. For example, the processor 50 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent devices, or may be integrated into one or more processors.

The processor may generate an operation control signal based on instruction operation code and a time sequence signal to control instruction fetching and instruction executing.

An internal memory may further be disposed in the processor 50, and is configured to store instructions and data. In some embodiments, the memory in the processor 50 may be a cache. The memory may store instructions or data that have/has been used by the processor 50 or that are/is frequently used by the processor 50. If the processor 50 needs to use the instructions or data, the processor 50 may directly invoke the instructions or data from the memory. This avoids repeated access, reduces waiting time of the processor 50, and improves system efficiency.

In some embodiments, the processor 50 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like. The processor 50 may be connected to a module such as a touch sensor, an audio module, a wireless communication module, a display, or a camera by using at least one of the foregoing interfaces.

The memory 60 may be configured to store computer-executable program code. The executable program code includes instructions. The memory 60 may include a program storage area and a data storage area. The program storage area may store an operating system, an application required for at least one function (for example, a sound play function or an image play function), and the like. The data storage area may store data (such as audio data and a phone book) created during use of the display device 100, and the like. In addition, the memory 60 may include a high-speed random access memory: and may further include a non-volatile memory, for example, at least one magnetic disk storage device, a flash memory, or a universal flash storage (UFS). The processor 50 executes various function methods or data processing of the display device 100 by running the instructions stored in the memory 60 and/or the instructions stored in the memory disposed in the processor, for example, enabling the display 20 to display a target image.

The display device 100 may implement audio functions such as music play and sound play by using the audio module, the speaker, the processor, and the like. The audio module is configured to convert digital audio information into an analog audio signal output, and is also configured to convert an analog audio input into a digital audio signal. The audio module may further be configured to code and decode an audio signal. In some embodiments, the audio module may be disposed in the processor 50, or some function modules of the audio module are disposed in the processor 50, or some or all function modules of the audio module are disposed outside the processor 50).

The speaker (for example, the speaker 30), also referred to as a “horn”, is configured to convert an audio electrical signal into a sound signal. The display device 100 may play a sound such as music by using the speaker.

The speaker 30 is located on the inner side of the housing 10, and is integrated on a side that is of the main board 40 and that is opposite to the display 20. In other words, the speaker 30 is disposed on a rear side of the display 20. The rear side of the display 20 is a side opposite to a display surface of the display 20. A sound hole 121 is disposed on the rear housing 12, and a sound emitted by the speaker 30 is transmitted out of the housing 10 through the sound hole 121. The speaker 30 is coupled to the processor 50. The processor 50 is configured to run the instructions stored in the memory 60 and/or the instructions stored in the memory disposed in the processor, so that the speaker 30) emits a sound.

In an embodiment, the speaker 30 includes first speakers 31 and second speakers 32, and both the first speaker 31 and the second speaker 32 are fastened on the main board 40. Both the first speaker 31 and the second speaker 32 are coupled to the processor 50. A sound emitting direction of the first speaker 31 faces toward space in rear of and above the display device 100, and a sound emitting direction of the second speaker 32 faces toward space in front of the display device 100. It may be understood that the sound emitting direction of the first speaker 31 is an initial propagation direction of a sound emitted by the first speaker 31, and the space in rear of and above the display device 100 is a direction between space in rear of the display device 100 and space above the display device.

Certainly, in a scenario of another embodiment, the first speaker and the second speaker may also be fastened at another position in the housing. The first speaker and the second speaker are generally located at different positions. The sound emitting direction of the first speaker is different from that of the second speaker, and lengths of paths along which sounds arrive at the user are different. In another scenario of another embodiment, the speaker may further include another speaker other than the first speaker and the second speaker.

For example, in some embodiments, the first speaker may be located on the top of the display device 100, and the sound emitting direction of the first speaker is upward. In an embodiment, the sound emitted by the first speaker may face toward space directly above the display device 100, the sound emitted by the first speaker may face toward space in front of and above the display device 100, or the like. In addition, the first speaker and/or the second speaker may alternatively be located on a side of the display device 100. Both the first speaker and/or the second speaker may include a plurality of arrays of speakers.

Figure 3:
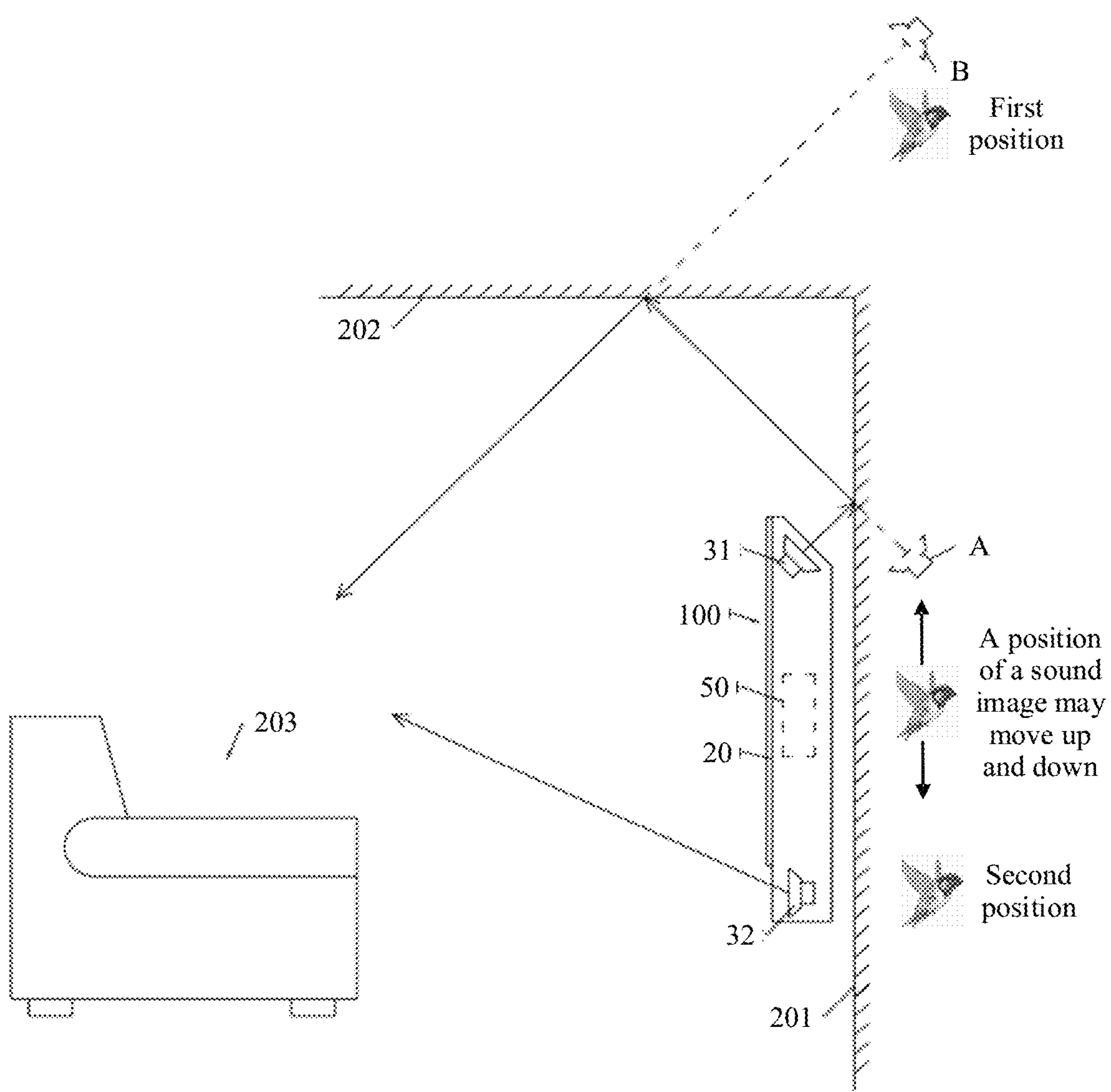
FIG. 3 is a schematic diagram of a structure of the display device shown in FIG. 1 when the display device is located in an application environment.

FIG. 3 is a schematic diagram of a structure of the display device 100 shown in FIG. 1 when the display device 100 is located in an application environment.

In an embodiment, the display device 100 is disposed close to a wall 201, the display 20 of the display device 100 faces away from the wall 201, and the top 101 of the display device 100 faces toward a ceiling 202. The sound emitted by the first speaker 31 is reflected by a first obstacle located in rear of the display device 100 to a second obstacle located above the display device 100, and is reflected by the second obstacle to a user viewing area in front of the display device 100. To be specific, the first obstacle in rear of the display device 100 is the wall 201, the second obstacle above the display device 100 is the ceiling 202, and a user viewing area 203 is in front of the display device 100.

Certainly, in another embodiment, the display device 100 may be in a different application environment, and the first obstacle may be another structure other than the wall 201, for example, a screen or a reflection panel. Alternatively, the second obstacle may be a blocking structure such as a reflection panel.

As shown in FIG. 3, for example, the sound emitted by the first speaker 31 is reflected by the wall 201 located in rear of the display device 100, to form a mirror sound source A. of the first speaker 31, that uses the wall 201 as a reflective surface. The sound reflected by the wall 201 continues to be transmitted to the ceiling 202 above the display device 100, and is reflected by the ceiling 202, to form a mirror sound source B. of the first speaker 31, that uses the ceiling 202 as a reflective surface. After the sound is reflected by the ceiling 202 again, the sound is projected downwards from the ceiling 202 to the user viewing area 203 in front of the display device 100 by using the mirror sound source B as a sound image. A position point, of a sound-emitting object, that is sensed by a person through a sound heard is referred to as a sound image.

Figure 4:
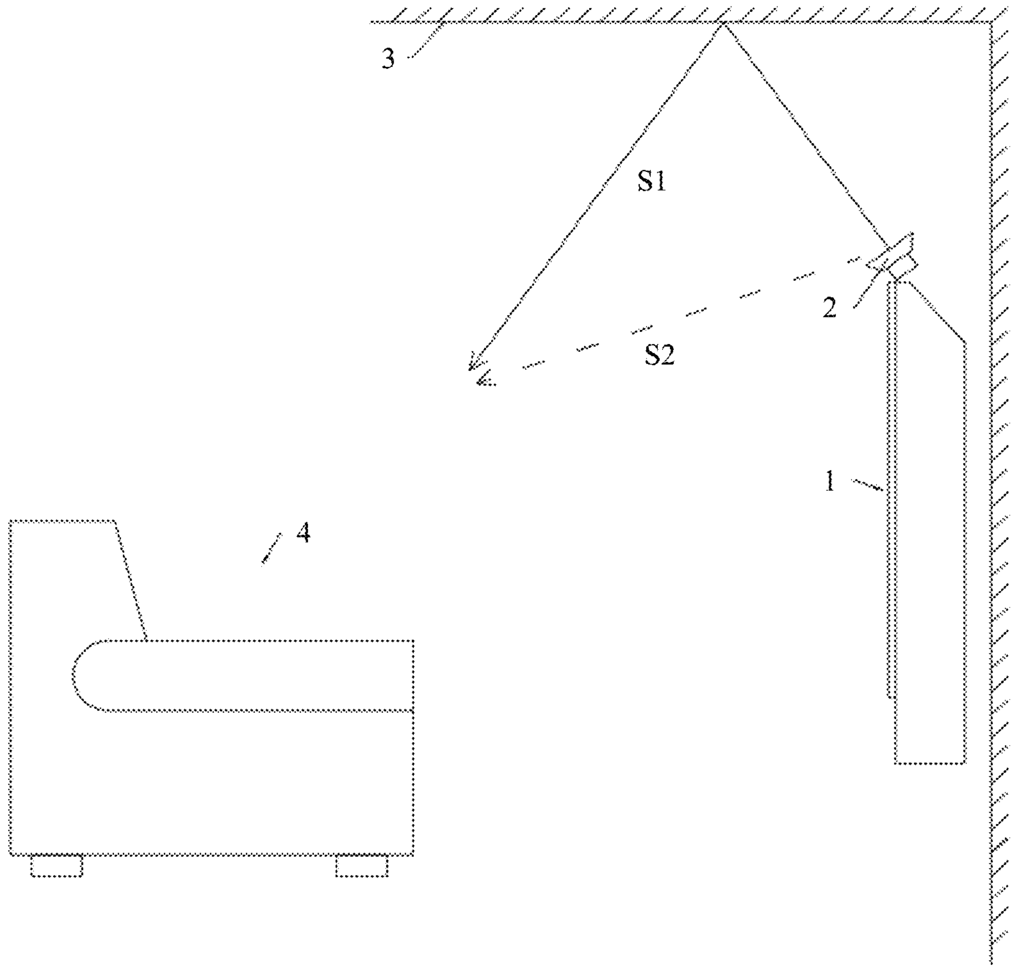
FIG. 4 is a schematic diagram of a structure of a display device in a related technology when the display device is located in an application environment.

It may be understood that, as shown in FIG. 4, in a related technology, a sound emitting direction of a speaker 2 faces toward space in front of and above a display device 1, so that a sound emitted by the speaker 2 can be transmitted to a ceiling 3, and is reflected by the ceiling 3 to a user viewing area 4. Because a sound wave radiated by the speaker 2 is directional, intensity of a sound wave propagated along an axial direction of the speaker 2 is the strongest, and the intensity of the sound wave gradually decreases as an axial deviation angle increases. A portion of the sound emitted by the speaker 2 arrives at the user viewing area 4 after being reflected by the ceiling 3, and this portion of the sound is referred to as a reflected sound S1. The other portion of the sound emitted by the speaker 2 is directly transmitted to the user viewing area 4 in front of the display device 1, and the other portion of the sound is referred to as a direct sound S2. Because the axial direction of the speaker 2 faces toward the space in front of and above the display device 1, and the direct sound S2 has a small axial deviation angle from the axial direction of the speaker 2, intensity of the direct sound S2 is strong. The direct sound S2 arrives at the user viewing area 4 before the reflected sound S1. Because of a Hass effect, human hearing has a feature that a sound that first arrives tends to be perceived as a dominant sound, and the reflected sound S1 that is delayed to arrive cannot be distinguished. Therefore, the direct sound S2 weakens an overhead sound image positioning effect of the reflected sound S1, and user experience is reduced.

In this application, the sound emitting direction of the first speaker 31 faces toward the space in rear of and above the display device 100. In other words, an axial direction of the first speaker 31 faces toward the space in rear of and above the display device 100. Because the axial direction of the first speaker 31 faces toward the space in rear of and above the display device 100, most sound of the first speaker 31 faces toward the wall 201. After being reflected by the wall 201, the sound is reflected by the ceiling 202 to the user viewing area 203. A small portion of the sound of the first speaker 31 deviates greatly from the axial direction, and can face toward space directly in front of the display device 100 and directly arrive at the user viewing area 203. However, this portion of the sound has a large axial deviation angle from the main axial direction of the first speaker 31, and sound intensity is weak. Therefore, the sound that directly arrives at the user viewing area 203 has a weak shielding effect on the sound that arrives at the user viewing area 203 after being reflected twice by the wall 201 and the ceiling 202, an overhead sound image positioning effect of the sound that arrives at the user viewing area 203 after being reflected by the ceiling 202 is good, and audio-visual experience of the user is improved.

In addition, the sound emitted by the first speaker 31 is reflected by the wall 201 to the ceiling 202, and then is projected to the user viewing area 203 after being reflected by the ceiling 202. A sound image of the sound transmitted to the user viewing area 203 is a sound image located above the ceiling 202. In this way, a sound field range that is in a height direction and that is formed by the first speaker 31 is not limited to a size of the display 20, so that a sound field in the height direction can cover an entire spatial height of the application environment, to achieve an overhead sound image positioning effect. For example, a sound image of an aircraft engine can be positioned at a position above the display 20, and is played by using the first speaker 31, so that a picture played by the display 20 is consistent with sound positioning.

Refer to FIG. 2 and FIG. 3. In an embodiment, the first speaker 31 is disposed close to the top 101 of the display device 100, and the sound hole 121 of the rear housing is correspondingly disposed with the first speaker 31. To be specific, the first speaker 31 is located at a position below the top 101, so that the sound that is emitted by the first speaker 31 and that faces toward the space directly in front of the display device 100 is blocked by the housing 10 of the display device 100, the sound that is directly transmitted from the first speaker 31 to the user viewing area 203 is effectively reduced, and overhead sound image positioning is more accurate.

In an embodiment, there are two first speakers 31. One first speaker 31 is disposed close to one side 103 of the display device 100, and the other first speaker 31 is disposed close to the other side 103, to separately play audio information of a left channel and audio information of a right channel. Certainly, in another embodiment, there may be one or more first speakers 31. A quantity of first speakers 31 is not limited in this application.

Figure 5:
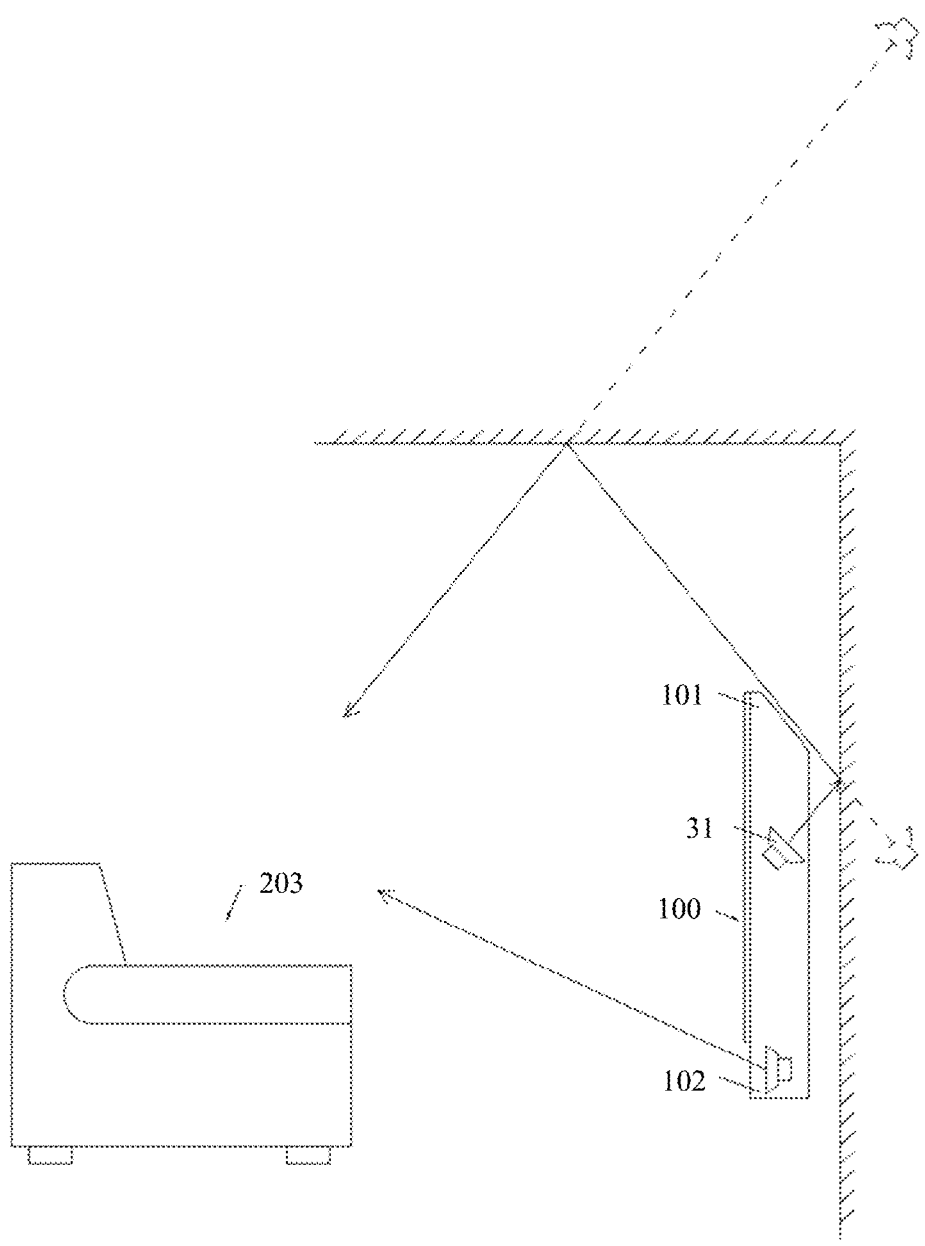
FIG. 5 is a schematic diagram of a structure of another embodiment of the display device shown in FIG. 3.

In an embodiment, the first speaker 31 may alternatively be located between a midpoint that is between the top 101 and the bottom 102 of the display device 100 and the top 101. In other words, the first speaker 31 may alternatively be located at any position in the upper half of the display device 100, as shown in FIG. 5. In embodiment, the first speaker 31 may alternatively be located on the top 101 of the display device 100. In an embodiment, a position of the first speaker 31 is further related to a distance from the display device 100 to the wall 201, a distance from the display device 100 to the ceiling 202, and an angle between the sound emitting direction of the first speaker 31 and a horizontal direction.

As shown in FIG. 3, the sound emitting direction of the first speaker 31 is at an angle of 35 degrees to 45 degrees (including 35 degrees and 45 degrees) relative to the horizontal direction, and the horizontal direction is a direction perpendicular to the display surface of the display 20. When the sound emitting direction of the first speaker 31 is at an angle of 35 degrees to 45 degrees relative to the horizontal direction, the display device 100 is applicable to a plurality of application environments with different spatial parameters. When the display device is used in the plurality of application environments with different spatial parameters, the sound emitted by the first speaker 31 can be sequentially reflected by walls 201 and ceilings 202 in different application environments, and finally arrive at the user viewing area 203. The spatial parameter is a set of a plurality of different parameters, for example, the distance between the display device 100 and the wall 201, the distance between the display device 100 and the ceiling 202, and a distance between the display device 100 and the user. In other words, the display device 100 can be used in a plurality of application environments with different spatial parameters within a distance range from the wall 201, a distance range from the ceiling 202, and a distance range from the user, to ensure audio-visual experience of the user.

Certainly, in another embodiment, the sound emitting direction of the first speaker 31 may alternatively be at an angle of 10 degrees to 80 degrees (including 10 degrees and 80 degrees) or another angle other than 10 degrees to 80 degrees relative to the horizontal direction, provided that it can be ensured that the sound emitted by the first speaker is sequentially reflected by the wall and the ceiling, and finally arrives at the user viewing area.

As shown in FIG. 1 and FIG. 3, the second speaker 32 is disposed closer to the bottom 102 compared with the first speaker 31. A first sound emitted by the first speaker 31 mixes with a second sound emitted by the second speaker 32 in the user viewing area, so that the user receives a combined sound formed by the sounds emitted by the speakers at different positions, to improve a stereoscopic sense of the sound.

In an embodiment, in an embodiment, the second speaker 32 is located at the bottom 102 of the display device 100. There are two second speakers 32. One second speaker 32 is disposed close to one side 103 of the display device 100, and the other second speaker 32 is disposed close to the other side 103 of the display device 100, to separately play the audio information of the left channel and the audio information of the right channel. Certainly, in another embodiment, there may be one or more second speakers 32. A quantity of second speakers 32 is not limited in this application.

In an embodiment, the second speaker may alternatively be disposed on a side of the display device. In an embodiment, the second speakers may alternatively be partially disposed at the bottom of the display device, and partially disposed at a side of the display device. In an embodiment, the second speaker may alternatively be located in the middle of the display device. Alternatively: some second speakers are located on the top of the display device, some second speakers are located at the bottom of the display device, and some second speakers are located in the middle of the display device. In an embodiment, the second speaker may emit a sound through vibration of the display. In other words, the second speaker forms through vibration of a part of the display. This enables a stereo effect without occupying internal space of the display device, and further helps improve a screen-to-body ratio of the display device.

In an embodiment, the sound emitting direction of the second speaker 32 faces toward the space in front of the display device 100. To be specific, the sound emitting direction of the second speaker faces toward the user viewing area 203, and the second speaker 32 may be configured to play a sound such as a footstep. That the sound emitting direction of the second speaker 32 faces towards the user viewing area 203 may mean that a sound transmission direction of the second speaker 32 directly faces toward the user viewing area 203, or a sound transmission direction of the second speaker 32 does not face toward the user viewing area 203, while the sound emitting direction is directed to the user viewing area 203 after the sound emitted by the second speaker 32 passes through a sound redirecting apparatus. Certainly, in another embodiment, the sound emitting direction of the second speaker may alternatively face toward the space below the display device.

FIG. 6 is a schematic diagram of a structure of the processor 50, the first speaker 31, and the second speaker 32 of the display device 100 shown in FIG. 3. The processor 50 includes the audio module. The audio module may include function modules such as an obtaining module, a rendering module, and a power amplifier module. The rendering module is coupled to both the obtaining module and the power amplifier module. The power amplifier module includes a first power amplifier module and a second power amplifier module. The first power amplifier module is coupled to the first speaker 31, and the second power amplifier module is coupled to the second speaker 32.

In an embodiment, the processor 50 may adjust a position of a sound image formed by the first sound emitted by the first speaker 31 and the second sound that is emitted by the second speaker 32 and that corresponds to the first sound. In an embodiment, the processor 50 adjusts, according to the following method, the position of the sound image formed by the first sound and the second sound.

Refer to FIG. 3, FIG. 6, and FIG. 7. FIG. 7 is a schematic diagram of an audio output processing process of the structure shown in FIG. 6.

The processor 50 adjusts, by controlling a volume ratio between the first sound emitted by the first speaker 31 and the second sound emitted by the second speaker 32, a position of a sound image formed by the first sound emitted by the first speaker 31 and the second sound emitted by the second speaker 32. In other words, when the volume ratio between the first sound and the second sound changes, the position of the sound image formed by the first sound and the second sound changes.

In an embodiment, the obtaining module obtains picture information and audio information of image content. The image content may be video content, a game, a real-time video, or the like. The real-time video may be, for example, a video call, a video live broadcast, or a video conference. First audio information and second audio information are extracted from the audio information, where the first audio information and the second audio information respectively correspond to the first speaker 31 and the second speaker 32, and the first audio information and the second audio information may correspond to same sound content. For example, sound content of the first audio information and the second audio information may correspond to "Hello" that is said by a same person.

The rendering module performs gain adjustment on volume of the first audio information and volume of the second audio information. In an embodiment, the rendering module determines a position of a sound image of the audio information based on the picture information, and adjusts a volume ratio between the first audio information and the second audio information based on the position of the sound image.

Then, the first audio information is sent to the first power amplifier module of the power amplifier module, and is transmitted to the first speaker 31 after power is amplified by the first power amplifier module. The second audio information is sent to the second power amplifier module of the power amplifier module, and is transmitted to the second speaker 32 after power is amplified by the second power amplifier module.

For example, when a position of a sound image of a person's voice "Hello" comes from the space below the display, the volume of the first audio information may be lower than the volume of the second audio information. A first audio signal and a second audio signal are respectively sent to the first speaker and the second speaker after being respectively amplified by the first power amplifier module and the second power amplifier module, so that volume of "Hello" emitted by the first speaker is lower than volume of "Hello" emitted by the second speaker. When the user hears two sound components. "Hello" emitted by the first speaker and "Hello" emitted by the second speaker, the user feels that the position of the sound image of "Hello" comes from the space below the display. When a position of a sound image of a person's voice "Hello" comes from the space above the display, the volume of the first audio information may be higher than the volume of the second audio information. A first audio signal and a second audio signal are respectively sent to the first speaker and the second speaker after being respectively amplified by the first power amplifier module and the second power amplifier module, so that volume of "Hello" emitted by the first speaker is higher than volume of "Hello" emitted by the second speaker. When the user hears two sound components. "Hello" emitted by the first speaker and "Hello" emitted by the second speaker, the user feels that the position of the sound image of "Hello" comes from the space above the display.

The volume ratio between the first sound emitted by the first speaker 31 and the second sound emitted by the second speaker 32 is adjusted, so that the position of the sound image is adjusted in the height direction, the position of the sound image and the picture are synchronized, and a stereo effect is good. The height direction is a direction from the top 101 of the display device 100 to the bottom 102 of the display device 100. The position of the sound image is the position of the sound image formed by the first sound and the second sound.

It may be understood that, as shown in FIG. 3, a position of the mirror sound source B of the first speaker 31 is a first position, and a position of the second speaker 32 is a second position. The processor 50 may adjust the volume ratio between the sound emitted by the first speaker 31 and the sound emitted by the second speaker 32, that is, the processor 50 may adjust the volume ratio between the first sound and the second sound, so that the position of the sound image of the first sound and the second sound may be adjusted between the first position and the second position. For example, when the first speaker 31 does not emit a sound, and the second speaker 32 emits a sound, the position of the sound image is located in the second position. When volume of the first speaker 31 is the same as that of the second speaker 32, the position of the sound image is near the middle of the first position and the second position.

For example, if the display 20 shows that a bird is flying from the bottom of the display device to the top, a position of a sound image of audio that corresponds to flight of the bird is also moving from the bottom to the top. Correspondingly, when the position of the sound image of the audio is at the bottom, the first speaker does not emit a sound, and the second speaker emits a sound. As the position of the sound image of the audio moves to the top, the first sound emitted by the first speaker gradually increases, and the second sound emitted by the second speaker gradually decreases, so that the position of the sound image formed by the first sound and the second sound is consistent with a flight path of the bird.

Figure 8:
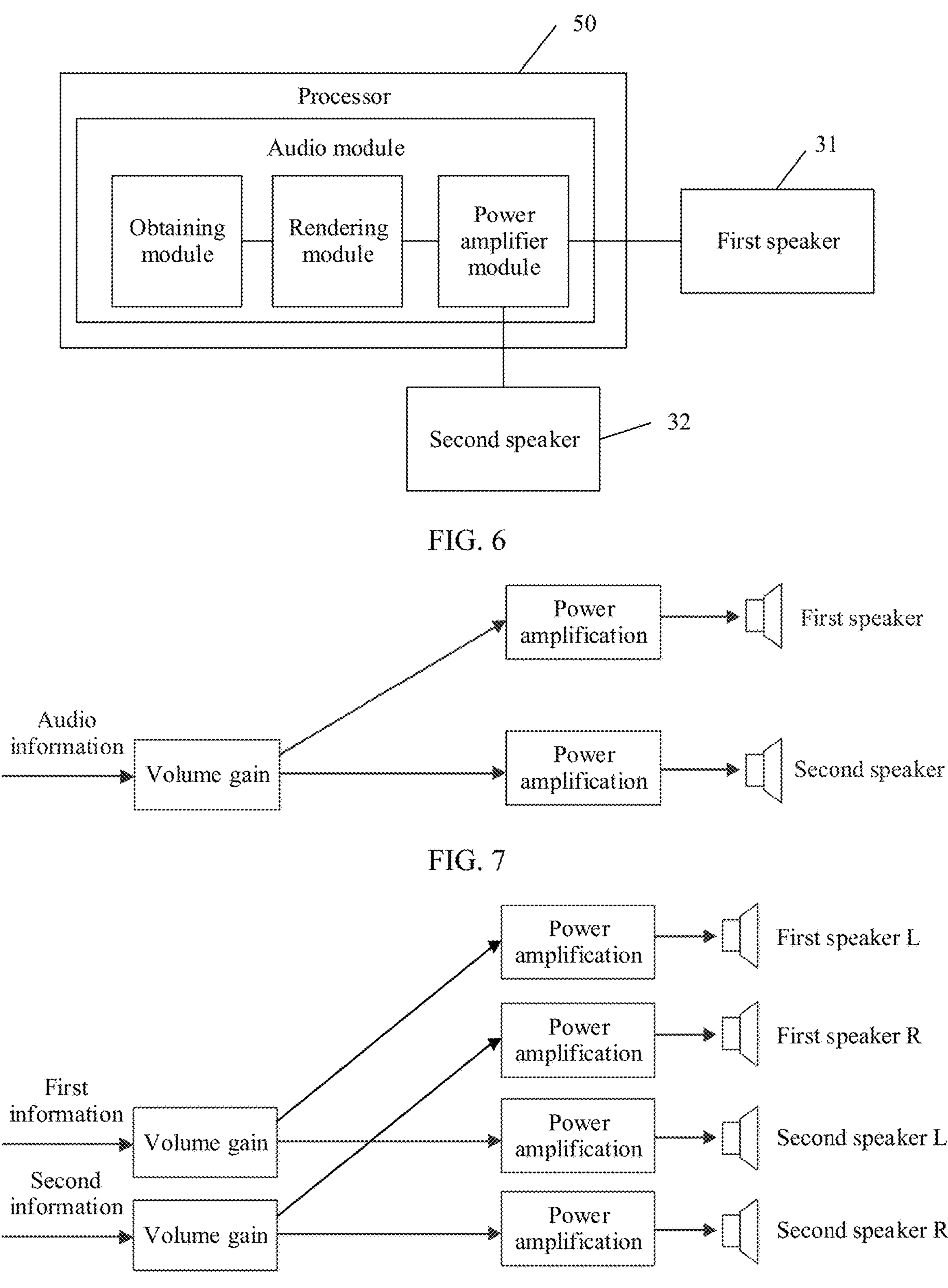
FIG. 8 is a schematic diagram of the audio output processing process shown in FIG. 7.

In an embodiment, as shown in FIG. 8, the obtaining module obtains the picture information and the audio information of the image content. The first audio information and the second audio information are extracted from the audio information. The audio information includes first information and second information, where the first information is the audio information of the left channel, and the second information is the audio information of the right channel. First sub-information and second sub-information are extracted from the first information. Third sub-information and fourth sub-information are extracted from the second information. The first sub-information and the third sub-information form the first audio information. The second sub-information and the fourth sub-information form the second audio information.

The rendering module performs gain adjustment on volumes of the first sub-information, the second sub-information, the third sub-information, and the fourth sub-information. In an embodiment, the rendering module determines the position of the sound image of the audio information based on the picture information, and adjusts a volume ratio among the first sub-information, the second sub-information, the third sub-information, and the fourth sub-information based on the position of the sound image.

The first power amplifier module includes a first power amplifier and a second power amplifier, and the second power amplifier module includes a third power amplifier and a fourth power amplifier. The two first speakers 31 are respectively a first speaker L (a first speaker on a left side) and a first speaker R (a first speaker on a right side), and the two second speakers 32 are respectively a second speaker L (a second speaker on the left side) and a second speaker R (a second speaker on the right side). The first sub-information rendered by the rendering module is sent to the first power amplifier, and is transmitted to the first speaker L after power is amplified by the first power amplifier. The third sub-information rendered by the rendering module is sent to the second power amplifier, and is transmitted to the first speaker R after power is amplified by the second power amplifier. The second sub-information rendered by the rendering module is sent to the third power amplifier, and is transmitted to the second speaker L after power is amplified by the third power amplifier. The fourth sub-information rendered by the rendering module is sent to the fourth power amplifier, and is transmitted to the second speaker R after power is amplified by the fourth power amplifier.

Figure 9:
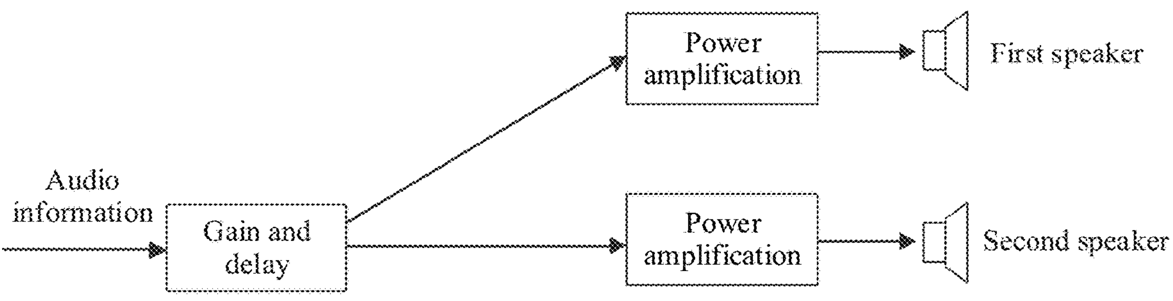
FIG. 9 is a schematic diagram of another audio output processing process of the structure shown in FIG. 6.
Figure 10:
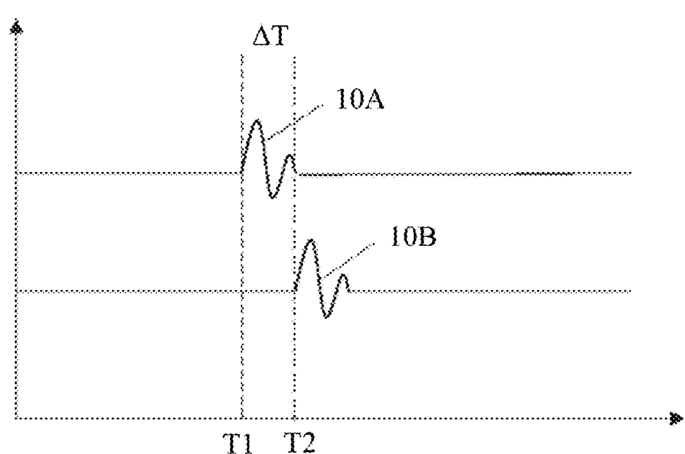
FIG. 10 is a schematic diagram of controlling a sound emitting time of a speaker in the audio output processing process shown in FIG. 9.

In this application, a volume ratio among sounds emitted by the first speaker L, the first speaker R, the second speaker L. and the second speaker R are adjusted, so that the position of the sound image is adjusted in three-dimensional space, the position of the sound image and the picture are synchronized, a real three-dimensional spatial sound field sound effect is implemented, and a stereo effect is good. FIG. 9 is a schematic diagram of another audio output processing process of the structure shown in FIG. 6, and FIG. 10 is a schematic diagram of controlling a sound emitting time of a speaker in the audio output processing shown in FIG. 9.

In some embodiments, the processor is further configured to control a sound emitting time of the first speaker and a sound emitting time of the second speaker. In other words, the first speaker and the second speaker emit sounds asynchronously. In an embodiment, the obtaining module obtains picture information and audio information of image content. The image content may be video content, a game, a real-time video, or the like. The real-time video may be, for example, a video call, a video live broadcast, or a video conference. First audio information and second audio information are extracted from the audio information, where the first audio information and the second audio information respectively correspond to the first speaker and the second speaker, and the first audio information and the second audio information may correspond to same sound content. For example, sound content of the first audio information and the second audio information may correspond to "Hello" that is said by a same person.

The rendering module performs gain adjustment on volume of the first audio information and volume of the second audio information. In an embodiment, the rendering module determines a position of a sound image of the audio information based on the picture information, and adjusts a volume ratio between the first audio information and the second audio information based on the position of the sound image. In addition, the rendering module further controls sending delays of sending the first audio information and the second audio information to a next module. Then, the first audio information is sent to the first power amplifier module of the power amplifier module, and is transmitted to the first speaker after power is amplified by the first power amplifier module. The first speaker emits the first sound at a first moment T1 (as shown in FIG. 10), and sends the second audio information to the second power amplifier module of the power amplifier module. The second audio information is transmitted to the second speaker after power is amplified by the second power amplifier module, and the second speaker emits the second sound at a second moment T2.

There is a time difference ΔT between the first moment and the second moment, and the first moment is earlier than the second moment. In FIG. 10, 10A represents a wave shape of the sound emitted by the first speaker after the first speaker receives the first audio information at the first moment T1, and 10B represents a wave shape of the sound emitted by the second speaker after the second speaker receives the second audio information at the second moment T2. A relationship between a wave shape of the first audio information and a wave shape of the second audio information is similar to a relationship between 10A and 10B. For example, there may also be a time difference between the wave shape of the first audio information and the wave shape of the second audio information.

For example, when a position of a sound image of a person's voice "Hello" comes from the space below the display, the volume of the first audio information may be lower than the volume of the second audio information. A first audio signal is sent to the first power amplifier module at a first time, and is sent to the first speaker after being amplified by the first power module, so that the first speaker emits "Hello" at the first moment (the wave shape represented by 10A may represent that the first speaker emits "Hello"). A second audio signal is sent to the second power amplifier module at a second time, and is sent to the second speaker after being amplified by the second power module, so that the second speaker emits "Hello" at the second moment (the wave shape represented by 10B may represent that the second speaker emits "Hello"). In this way, volume of "Hello" emitted by the first speaker is lower than volume of "Hello" emitted by the second speaker, and "Hello" emitted by the first speaker and "Hello" emitted by the second speaker simultaneously arrive at the user. When the user hears two sound components. "Hello" emitted by the first speaker and "Hello" emitted by the second speaker, the user feels that the position of the sound image of "Hello" comes from the space below the display.

For example, when a position of a sound image of a person's voice "Hello" comes from the space above the display, the volume of the first audio information may be higher than the volume of the second audio information. A first audio signal is sent to the first power amplifier module at a first time, and is sent to the first speaker after being amplified by the first power module, so that the first speaker emits "Hello" at the first moment. A second audio signal is sent to the second power amplifier module at a second time, and is sent to the second speaker after being amplified by the second power module, so that the second speaker emits "Hello" at the second moment. In this way, volume of "Hello" emitted by the first speaker is higher than volume of "Hello" emitted by the second speaker, and "Hello" emitted by the first speaker and "Hello" emitted by the second speaker simultaneously or almost simultaneously arrive at the user. When the user hears two sound components. "Hello" emitted by the first speaker and "Hello" emitted by the second speaker, the user feels that the position of the sound image of "Hello" comes from the space above the display.

In an embodiment, the volume ratio between the first sound emitted by the first speaker and the second sound emitted by the second speaker is adjusted, so that the position of the sound image is adjusted in the height direction, and the position of the sound image and the picture are synchronized. In addition, the first speaker emits the sound at the first moment T1, and the second speaker emits the sound at the second moment T2, so that the user can simultaneously or almost simultaneously receive the first sound and the second sound at a third moment. Sound image positioning is more accurate, and a position deviation between the picture and the position of the sound image does not occur, so that the position of the sound image and the picture are accurately synchronized, a stereo effect is good, and user experience is improved.

It may be understood that the third moment may be a moment, or may be a small moment range. To be specific, the user may simultaneously receive the first sound and the second sound at the third moment, or the user may receive the second sound at a time interval after receiving the first sound. However, the user cannot sense the time interval. In other words, the time interval does not cause a deviation for the user to position the position of the sound image.

It may be understood that the time difference ΔT=(D1−D2)/V, where D1 is a transmission path along which the first sound emitted by the first speaker is transmitted from the first speaker to the user viewing area. D2 is a transmission path along which the second sound emitted by the second speaker is transmitted from the second speaker to the user viewing area, and V=340) m/s (a sound speed in air). In an embodiment, a value of the time difference ΔT may be from 1 ms to 50 ms, for example, 2 ms, 5 ms, or 10 ms, and stereo adjustment may be accurately performed.

In some embodiments, when the position of the sound image changes, the time difference ΔT may also change to strengthen position information of the sound image. For example, a position of a sound image of a person's voice "Hello" moves from the space below the display to the space above the display: When the position of the sound image is located below the display, a time difference is ΔT1. When the position of the sound image is located above the display, a time difference is ΔT2. The time difference ΔT2 is less than the time difference ΔT1. In other words, in a process in which the position of the sound image moves from the space below the display to the space above the display. "Hello" emitted by the first speaker is received by the user before "Hello" emitted by the second speaker, so that the user can clearly feel movement of the position of the sound image.

Figure 11:
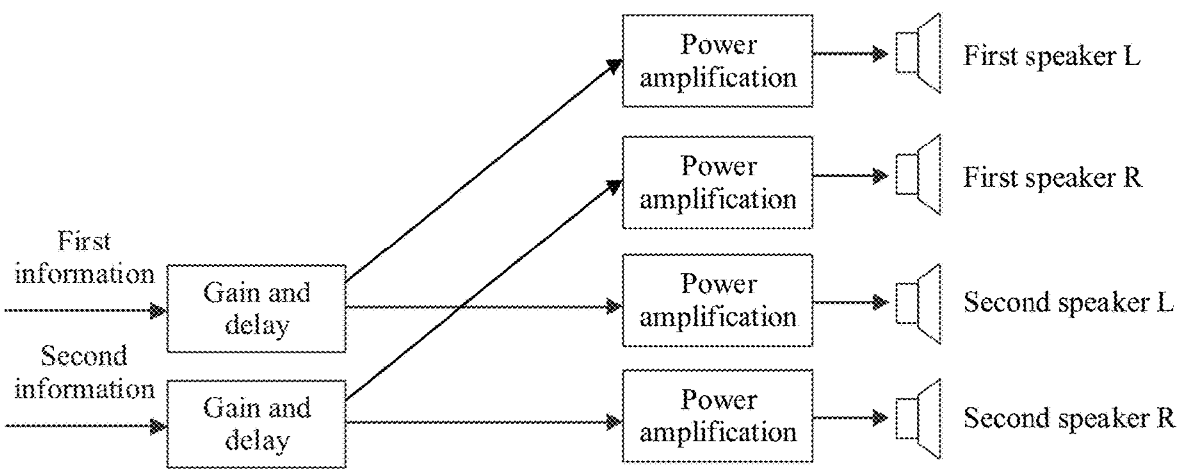
FIG. 11 is a schematic diagram of the audio output processing process shown in FIG. 10.

In an embodiment, as shown in FIG. 11, the obtaining module obtains the picture information and the audio information of the image content. The first audio information and the second audio information are extracted from the audio information. The audio information includes first information and second information, where the first information is the audio information of the left channel, and the second information is the audio information of the right channel. First sub-information and second sub-information are extracted from the first information. Third sub-information and fourth sub-information are extracted from the second information. The first sub-information and the third sub-information form the first audio information. The second sub-information and the fourth sub-information form the second audio information.

The rendering module performs gain adjustment on volumes of the first sub-information, the second sub-information, the third sub-information, and the fourth sub-information. In an embodiment, the rendering module determines the position of the sound image of the audio information based on the picture information, and adjusts a volume ratio among the first sub-information, the second sub-information, the third sub-information, and the fourth sub-information based on the position of the sound image. In addition, the rendering module further controls sending delays of sending the first sub-information, the second sub-information, the third sub-information, and the fourth sub-information to a next module.

The first power amplifier module includes a first power amplifier and a second power amplifier, and the second power amplifier module includes a third power amplifier and a fourth power amplifier. The two first speakers are respectively a first speaker L (a first speaker on a left side) and a first speaker R (a first speaker on a right side), and the two second speakers are respectively a second speaker L (a second speaker on the left side) and a second speaker R (a second speaker on the right side). The first sub-information rendered by the rendering module is sent to the first power amplifier, and is transmitted to the first speaker L after power is amplified by the first power amplifier. The third sub-information rendered by the rendering module is sent to the second power amplifier, and is transmitted to the first speaker R after power is amplified by the second power amplifier. The first speaker L and the first speaker R emit sounds at the first moment T1. The second sub-information rendered by the rendering module is sent to the third power amplifier, and is transmitted to the second speaker L after power is amplified by the third power amplifier. The fourth sub-information rendered by the rendering module is sent to the fourth power amplifier, and is transmitted to the second speaker R after power is amplified by the fourth power amplifier. The second speaker L and the second speaker R emit sounds at the second moment T2. There is a time difference between the first moment and the second moment.

In an embodiment, a volume ratio among sounds emitted by the first speaker L, the first speaker R, the second speaker L. and the second speaker R are adjusted, so that the position of the sound image is adjusted, and the position of the sound image and the picture are synchronized. In addition, the first speaker L and the first speaker R emit sounds at the first moment T1, and the second speaker L and the second speaker R emit sounds at the second moment T2, so that the user can simultaneously receive, at the third moment, the sounds emitted by the first speaker L, the first speaker R, the second speaker L. and the second speaker R. Sound image positioning is more accurate, and a position deviation between the picture and the position of the sound image does not occur, so that the position of the sound image and the picture are accurately synchronized, a stereo effect is good, and user experience is improved.

Certainly, in some embodiments, the processor may alternatively control only the sound emitting time of the first speaker and the sound emitting time of the second speaker, that is, the first speaker and the second speaker emit sounds asynchronously, so that the first sound emitted by the first speaker and the second sound emitted by the second speaker simultaneously arrive at the user viewing area and are simultaneously received by the user, a stereo effect is good, and user experience is improved.

Figure 12:
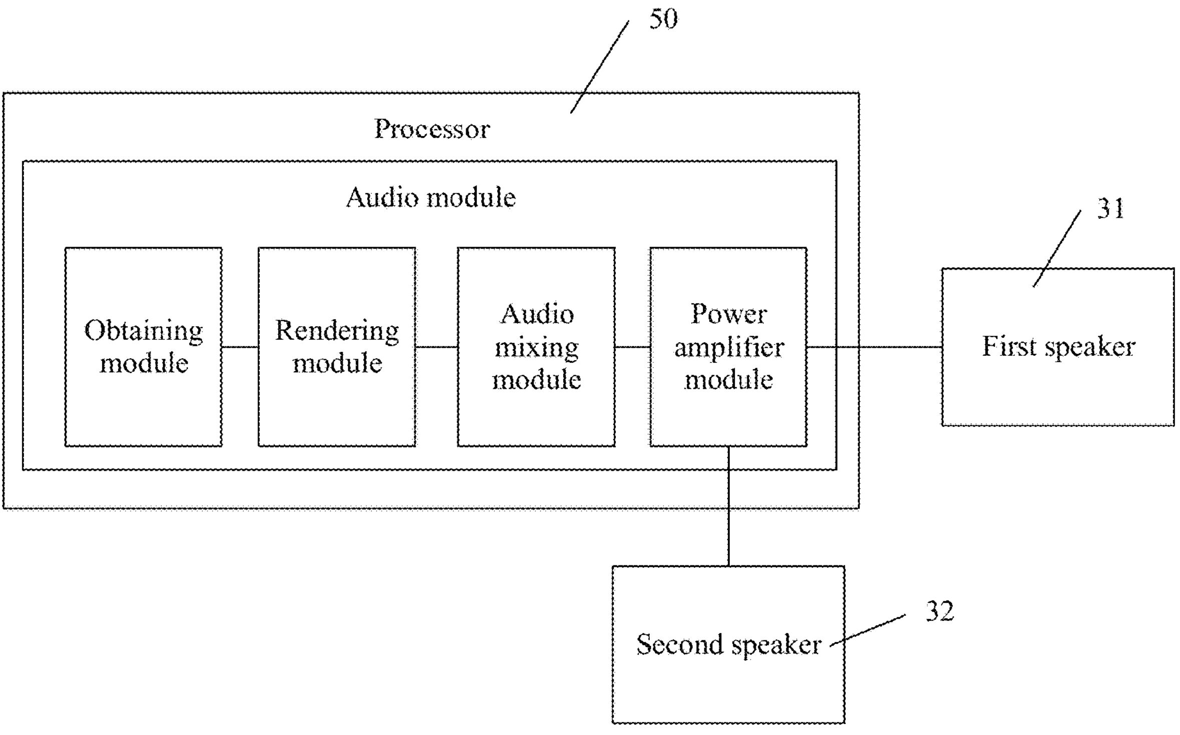
FIG. 12 is a schematic diagram of a structure of another embodiment of the structure shown in FIG. 6.
Figure 13:
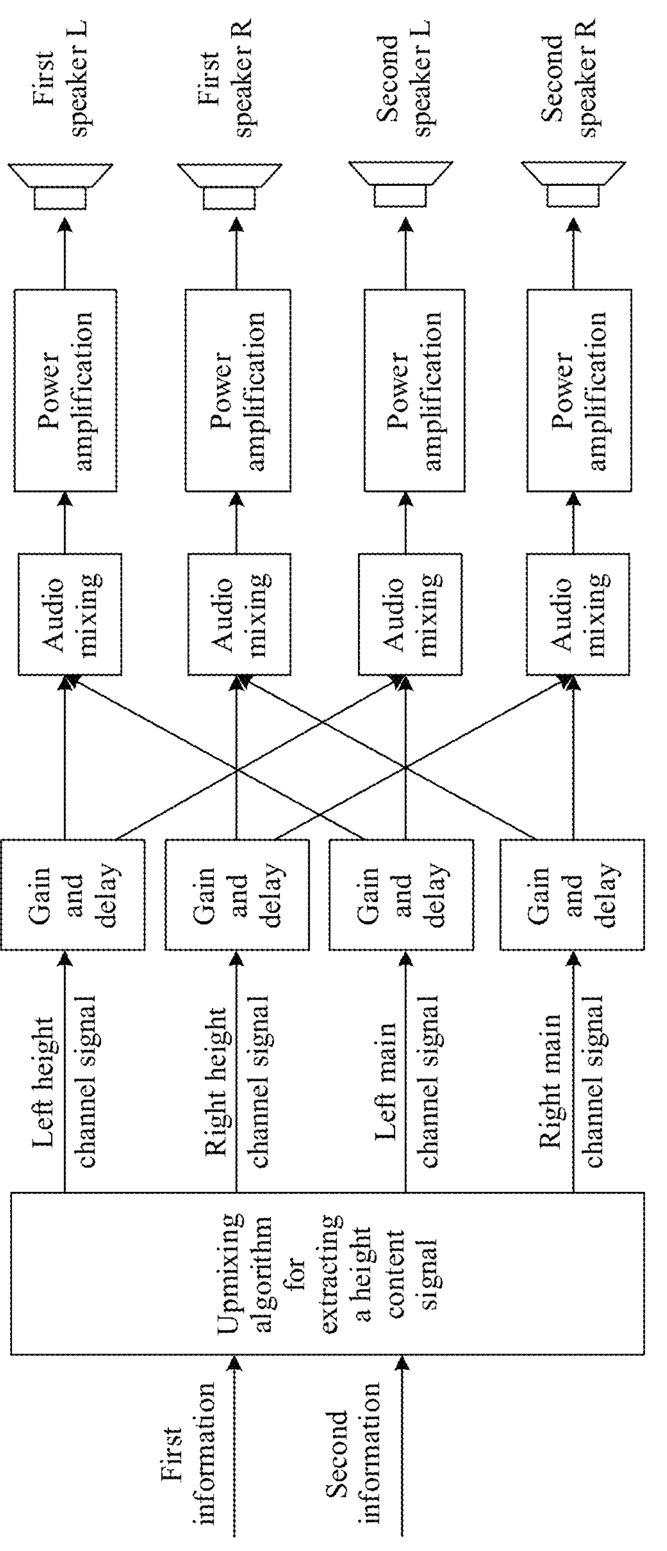
FIG. 13 is a schematic diagram of an audio output processing process of the structure shown in FIG. 12.

In some embodiments, refer to FIG. 12 and FIG. 13. FIG. 12 is a schematic diagram of a structure of another embodiment of the structure shown in FIG. 6. FIG. 13 is a schematic diagram of an audio output processing process of the structure shown in FIG. 12.

The processor 50 includes the audio module. The audio module may include function modules such as an obtaining module, a rendering module, an audio mixing module, and a power amplifier module. The obtaining module, the rendering module, the audio mixing module, and the power amplifier module are sequentially coupled, and the power amplifier module is coupled to both the first speaker 31 and the second speaker 32. Audio information of image content is processed by the processor 50 by using an upmixing algorithm.

In an embodiment, the obtaining module obtains picture information and the audio information of the image content. The image content may be video content, a game, a real-time video, or the like. The real-time video may be, for example, a video call, a video live broadcast, or a video conference. First audio information and second audio information are extracted from the audio information. The audio information includes first information and second information, where the first information is the audio information of the left channel, and the second information is the audio information of the right channel.

After the first information and the second information are processed by using the upmixing algorithm that is for extracting a height content signal, the first information generates a left height channel signal and a left main channel signal, and the second information is divided into a right height channel signal and a right main channel signal. Then, the left height channel signal is divided into a first signal and a second signal, the right height channel signal is divided into a third signal and a fourth signal, the left main channel signal is divided into a fifth signal and a sixth signal, and the right main channel signal is divided into a seventh signal and an eighth signal. The first information, the third signal, the fifth signal, and the seventh signal form the first audio information. The second information, the fourth signal, the sixth signal, and the eighth signal form the second audio information.

The rendering module performs gain adjustment on volumes of the first signal, the second signal, the third signal, the fourth signal, the fifth signal, the sixth signal, the seventh signal, and the eighth signal. In an embodiment, the rendering module determines a position of a sound image of the audio information based on the picture information, and adjusts a volume ratio among the first signal, the second signal, the third signal, the fourth signal, the fifth signal, the sixth signal, the seventh signal, and the eighth signal based on the position of the sound image. In addition, the rendering module further controls sending delays of sending the first signal, the second signal, the third signal, the fourth signal, the fifth signal, the sixth signal, the seventh signal, and the eighth signal to one module.

The audio mixing module includes a first module, a second module, a third module, and a fourth module. The first module performs audio mixing on the first signal and the fifth signal that are rendered by the rendering module to obtain a first mixed audio. The second module performs audio mixing on the third signal and the seventh signal that are rendered by the rendering module to obtain a second mixed audio. The third module performs audio mixing on the second signal and the sixth signal that are rendered by the rendering module to obtain a third mixed audio. The fourth module performs audio mixing on the fourth signal and the eighth signal that are rendered by the rendering module to obtain a fourth mixed audio.

The power amplifier module includes a first power amplifier module and a second power amplifier module. The first power amplifier module includes a first power amplifier and a second power amplifier, and the second power amplifier module includes a third power amplifier and a fourth power amplifier. The two first speakers 31 are respectively a first speaker L (a first speaker on a left side) and a first speaker R (a first speaker on a right side), and the two second speakers 32 are respectively a second speaker L (a second speaker on the left side) and a second speaker R (a second speaker on the right side). The first mixed audio is sent to the first power amplifier, and is transmitted to the first speaker L after power is amplified by the first power amplifier. The second mixed audio is sent to the second power amplifier, and is transmitted to the first speaker R after power is amplified by the second power amplifier. The first speaker L and the first speaker R emit sounds at a first moment. The third mixed audio is sent to the third power amplifier, and is transmitted to the second speaker L after power is amplified by the third power amplifier. The fourth mixed audio is sent to the fourth power amplifier, and is transmitted to the second speaker R after power is amplified by the fourth power amplifier. The second speaker L and the second speaker R emit sounds at a second moment. There is a time difference between the first moment and the second moment.

In this application, after the audio information of the image content is processed by using the upmixing algorithm that is for extracting the height content signal, sound image positioning of content of the left height channel signal, the right height channel signal, the left main channel signal, and the right main channel signal at a position in the height direction is effectively implemented, so that positioning of sound images of various sounds in the height direction may be adjusted as required, and positioning of various sounds and positioning of the picture may be integrated. For example, a sound image of an aircraft engine can be positioned above the display: a sound image of a person's dialog is positioned in the middle of the display, and a sound image of a footstep is positioned at the bottom of the display.

Figure 14:
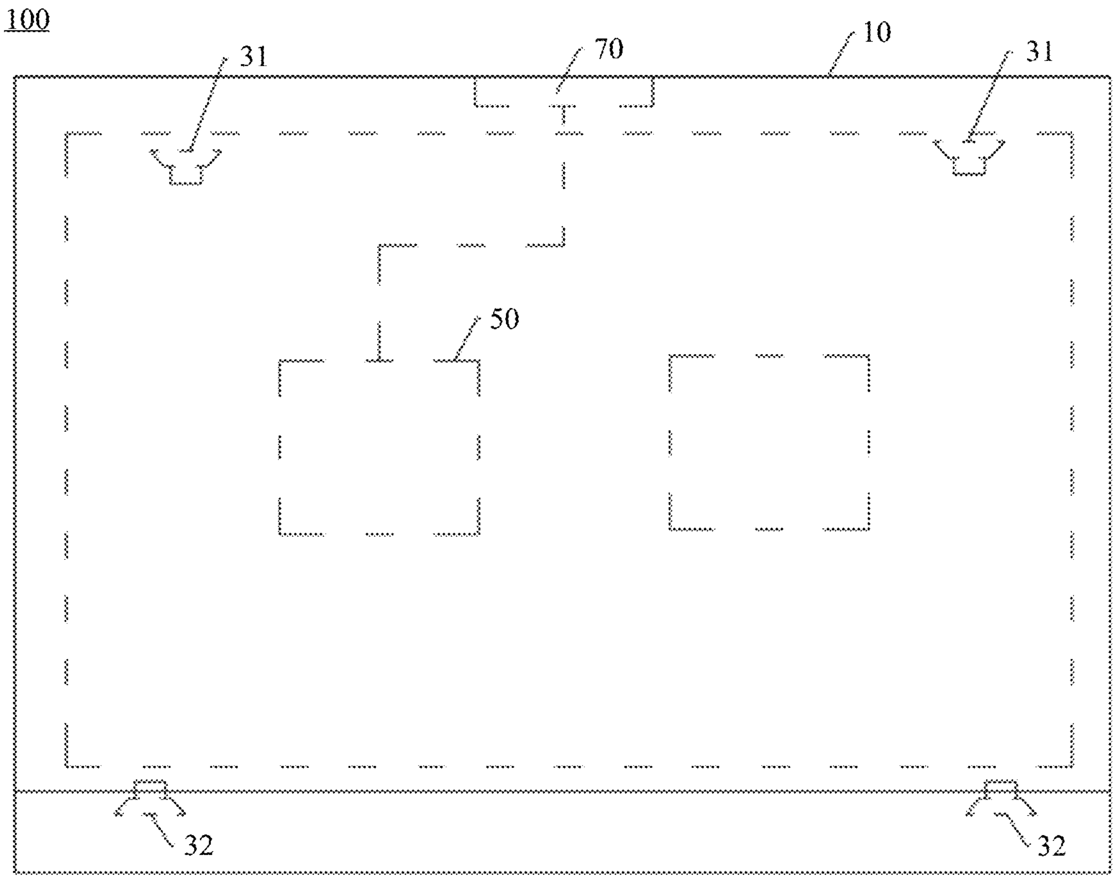
FIG. 14 is a schematic diagram of a structure of another embodiment of the display device shown in FIG. 1.

FIG. 14 is a schematic diagram of a structure of another embodiment of the display device 100 shown in FIG. 1.

An embodiment is roughly the same as the embodiment shown in FIG. 1. A difference lies in that the display device 100 in an embodiment further includes a distance detector 70, where the distance detector 70 is disposed inside the housing 10, and the distance detector 70 is coupled to the processor 50. Certainly, the distance detector 70 may also be disposed outside the housing 10. The distance detector 70 is configured to detect a spatial parameter of an application environment of the display device 100. The spatial parameter includes a plurality of parameters, for example, a first distance between the display device 100 and a wall, a second distance between the display device 100 and a ceiling, and a third distance between the display device 100 and a user.

A sound emitting direction of the first speaker 31 can be adjusted. In an embodiment, the first speaker 31 may adjust the sound emitting direction based on the spatial parameter. For example, the display device 100 may include a driving component. The first speaker 31 is disposed on the driving component or cooperates with the driving component. The driving component is coupled to the processor. The processor is configured to drive the driving component to adjust the sound emitting direction of the first speaker 31 based on the spatial parameter obtained by the distance detector 70. To be specific, when the spatial parameter of the application environment of the display device changes, the sound emitting direction of the first speaker 31 is variable, so that the display device 100 is applicable to different application environments. The sound emitting direction of the first speaker is adjusted based on the application environment, to implement automatic adjustment of the sound emitting direction of the first speaker, so that a first sound emitted by the first speaker can be accurately transmitted to a user viewing area, and user experience is improved. The display device 100 may further adjust a position of the user viewing area based on a position of the user, so that the user can have good audio-visual experience regardless of a position the user moves to.

Certainly, in an embodiment, the spatial parameter further includes a distance between the display device 100 and another obstacle. Alternatively, the spatial parameter includes at least one of the first distance, the second distance, the third distance, and the like. In an embodiment, the sound emitting direction of the first speaker 31 may also be manually adjusted.

It may be understood that the display device 100 in an embodiment may adjust the sound emitting direction of the first speaker 31 based on the application environment of the display device 100. When the display device 100 is used for the first time, or the display device 100 is moved to a new application environment, the display device 100 detects a spatial parameter of the application environment by using the distance detector 70. The display device 100 adjusts the sound emitting direction of the first speaker 31 by using the spatial parameter, so that the display device 100 can ensure that in different application environments, the first sound emitted by the first speaker 31 is accurately transmitted to the user viewing area after being reflected, to improve audio-visual experience of the user.

In some embodiments, the display device 100 may further include a sensing sensor, that is, a sensor that senses that the display device 100 is moved or senses that a position of the display device 100 changes. For example, the sensing sensor may be a gyroscope, an accelerometer, or the like. After detecting that the position of the display device 100 changes, the sensing sensor may trigger the distance detector 70) to detect the spatial parameter of the application environment, so that the first speaker 31 adjusts the sound emitting direction based on the spatial parameter. Therefore, the distance detector 70 obtains the spatial parameter of the application environment provided that the position of the display device 100 changes, so that the first speaker 31 adjusts the sound emitting direction based on the spatial parameter, to ensure audio-visual experience of the user at all times.

It may be understood that, when the display device 100 is powered off, the sensing sensor may also record information that the display device 100 is moved. After the display device 100 is powered on the sensing sensor triggers the distance detector 70 to detect the spatial parameter of the application environment, so that the sound emitting direction of the first speaker 31 is adjusted based on the spatial parameter. Even if the display device 100 is moved after the power-off, the sound emitting direction of the first speaker 31 is still adjusted based on the application environment when the display device 100 is enabled again, to ensure audio-visual experience of the user.

In an embodiment, the distance detector 70) includes a radar, and the radar can transmit and receive ultrasonic waves. Compared with data obtained in another manner, a spatial parameter, of the application environment, that is measured by using the ultrasonic waves is more accurate. Certainly, in an embodiment, the distance detector 70 may further include a microphone. To be specific, the display device 100 emits a sound, and the sound is received by the microphone after being reflected back to the display device 100 by an obstacle. A distance between the display device 100 and the obstacle is obtained by calculating a time difference between a sound emitting time and a sound receiving time.

In an embodiment, the distance detector 70) includes a camera, and the distance between the display device 100 and the obstacle is identified through photographing by using the camera. The obstacle may be a wall, a ceiling, a user, or the like. In an embodiment, the distance detector 70 may further include at least two of a radar, a microphone, and a camera, and different distance measuring manners are used for different obstacles, to obtain a more accurate spatial parameter.

In an embodiment, the distance detector 70 is coupled to the processor 50, and the distance detector 70 sends an instruction to the processor 50. The instruction may be a pulse signal or an analog signal that includes spatial parameter information. The time difference between a first moment and a second moment changes in response to the instruction. In an embodiment, the processor 50 adjusts the time difference between the first moment and the second moment based on information carried in the instruction, for example, the first distance, the second distance, and the third distance. In other words, when the spatial parameter of the application environment of the display device 100 changes, the time difference between the first moment and the second moment changes, to ensure that the sound emitted by the first speaker 31 and a sound emitted by the second speaker 32 simultaneously arrive at the user viewing area. In this way, sound image positioning is more accurate. Certainly, in another embodiment, the distance detector 70 may further detect a path along which the sound emitted by the first speaker 31 arrives at the user area and a path along which the sound emitted by the second speaker 32 arrives at the user area, and determine the time difference between the first moment and the second moment based on a difference between the two paths.

In another embodiment, the display device may further include a user input entry. The user input entry may be application software that is in a mobile phone and that interacts with the display device, or may be a setting window of the display device. The user fills in the spatial parameter such as the first distance, the second distance, or the third distance through the user input entry, and the first speaker adjusts the sound emitting direction of the first speaker based on data filled in by the user. This method is less expensive than obtaining the spatial parameter by using the distance detector.

Figure 15:
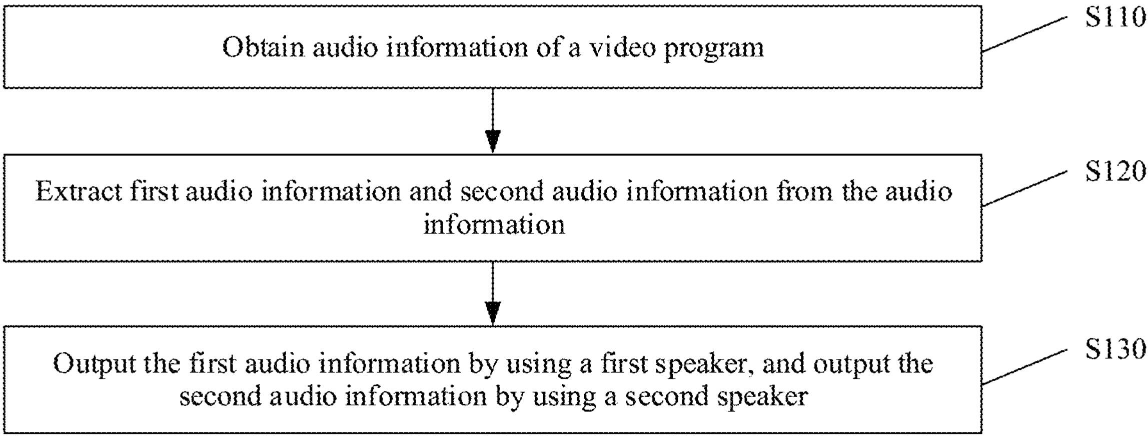
FIG. 15 is a schematic flowchart of an audio output method for a display device according to an embodiment.

FIG. 15 is a schematic flowchart of an audio output method for the display device 100 according to an embodiment. The audio output method is applied to the display device 100 shown in FIG. 1. The audio output method includes the following operations S110 to S130.

S110: Obtain audio information.

In an embodiment, as shown in FIG. 8, picture information and the audio information of image content are obtained by using an obtaining module. The image content may be video content, a game, a real-time video, or the like. The real-time video may be, for example, a video call, a video live broadcast, or a video conference. The audio information includes first information and second information, where the first information is audio information of a left channel, and second information is audio information of a right channel.

S120: Extract first audio information and second audio information from the audio information.

In an embodiment, as shown in FIG. 8, the obtaining module extracts first sub-information and second sub-information from the first information, and extracts third sub-information and fourth sub-information from the second information. The first sub-information and the third sub-information form the first audio information. The second sub-information and the fourth sub-information form the second audio information. The first audio information and the second audio information respectively correspond to a first speaker and a second speaker. The first audio information and the second audio information may correspond to same sound content. For example, sound content of the first audio information and the second audio information may correspond to "Hello" that is said by a same person.

S130: Output the first audio information by using a first speaker 31, and output the second audio information by using a second speaker 32.

In an embodiment, as shown in FIG. 3 and FIG. 8, the first audio information and the second audio information are first processed, to adjust a position of a sound image formed by a first sound emitted by the first speaker 31 and a second sound emitted by the second speaker 32. Processing the first audio information and the second audio information includes adjusting a volume ratio between the first audio information and the second audio information.

For example, a rendering module performs gain adjustment on volumes of the first sub-information, the second sub-information, the third sub-information, and the fourth sub-information. In an embodiment, the rendering module determines a position of a sound image of the audio information based on the picture information, and adjusts a volume ratio among the first sub-information, the second sub-information, the third sub-information, and the fourth sub-information based on the position of the sound image.

Then, the first sub-information rendered by the rendering module is sent to a first power amplifier, and is transmitted to a first speaker L (a first speaker on a left side) after power is amplified by the first power amplifier. The third sub-information rendered by the rendering module is sent to a second power amplifier, and is transmitted to a first speaker R (a first speaker on a right side) after power is amplified by the second power amplifier. The second sub-information rendered by the rendering module is sent to a third power amplifier, and is transmitted to a second speaker L (a second speaker on the left side) after power is amplified by the third power amplifier. The fourth sub-information rendered by the rendering module is sent to a fourth power amplifier, and is transmitted to a second speaker R (a second speaker on a right side) after power is amplified by the fourth power amplifier.

According to the audio output method, a volume ratio among sounds emitted by the first speaker L, the first speaker R, the second speaker L. and the second speaker R is adjusted, so that the position of the sound image is adjusted in three-dimensional space, the position of the sound image and a picture are synchronized, and a real three-dimensional spatial sound field sound effect is implemented. In addition, a sound emitting direction of the first speaker of this application faces toward space in rear of and above the display device, so that a sound that is reflected by a ceiling and arrives at a user viewing area has a good overhead sound image positioning effect, a stereo effect is good, and audio-visual experience of a user is improved.

Certainly, in an embodiment, processing the first audio information and the second audio information may further include: controlling the first speaker 31 to emit a sound at a first moment: controlling the second speaker 32 to emit a sound at a second moment: and simultaneously receiving, by the user, the sound of the first speaker 31 and the sound of the second speaker 32 at a third moment. There is a time difference between the first moment and the second moment, and the first moment is earlier than the second moment, so that the first speaker receives the first audio information, the second speaker receives the second audio information corresponding to the first audio information. A play time of the first audio information is asynchronous with a play time of the second audio information. In an embodiment, as shown in FIG. 11, when the rendering module adjusts the volume ratio among the first sub-information, the second sub-information, the third sub-information, and the fourth sub-information, the rendering module further controls sending delays of sending the first sub-information, the second sub-information, the third sub-information, and the fourth sub-information to a next module.

The first sub-information rendered by the rendering module is sent to the first power amplifier, and is transmitted to the first speaker L after power is amplified by the first power amplifier. The third sub-information rendered by the rendering module is sent to the second power amplifier, and is transmitted to the first speaker R after power is amplified by the second power amplifier. The first speaker L and the first speaker R emit sounds at the first moment. The second sub-information rendered by the rendering module is sent to the third power amplifier, and is transmitted to the second speaker L after power is amplified by the third power amplifier. The fourth sub-information rendered by the rendering module is sent to the fourth power amplifier, and is transmitted to the second speaker R after power is amplified by the fourth power amplifier. The second speaker L and the second speaker R emit sounds at the second moment. There is a time difference between the first moment and the second moment.

In an embodiment, a volume ratio among the sounds emitted by the first speaker L, the first speaker R, the second speaker L. and the second speaker R is adjusted, so that the position of the sound image is adjusted, and the position of the sound image and a picture are synchronized. In addition, the first speaker L and the first speaker R are controlled to emit sounds at the first moment, and the second speaker L and the second speaker R are controlled to emit sounds at the second moment. To be specific, after receiving the first audio information, the first speaker emits the first sound at the first moment, and after receiving the second audio information, the second speaker emits the second sound corresponding to the first sound at the second moment. In this way, the user can simultaneously receive, at the third moment, the sounds emitted by the first speaker L, the first speaker R, the second speaker L. and the second speaker R. Sound image positioning is more accurate, and a position deviation between the picture and the position of the sound image does not occur, so that the position of the sound image and the picture are accurately synchronized, a stereo effect is good, and user experience is improved.

Certainly, in another embodiment, according to the audio output method, the first speaker may only be controlled to emit the sound at the first moment, and the second speaker may only be controlled to emit the sound at the second moment, so that the user can simultaneously receive, at the third moment, the sound emitted by the first speaker and the sound emitted by the second speaker, a stereo effect is good, and user experience is improved.

In an embodiment, as shown in FIG. 12, according to the audio output method, the first information and the second information may further be processed by using an upmixing algorithm that is for extracting a height content signal, to generate a left height channel signal, a right height channel signal, a left main channel signal, and a right main channel signal. Then, after gain, delay, audio mixing, and power amplification processing is separately performed on the left height channel signal, the left height channel signal is transmitted to both the first speaker L and the second speaker L, to implement sound image positioning of content of the left height channel signal at a position in a height direction. Similarly: sound image positioning at a position in the height direction is implemented in a same manner for the right height channel signal, the left main channel signal, and the right main channel signal. Details are not described again.

In an embodiment, after the audio information of the image content is processed by using the upmixing algorithm that is for extracting the height content signal, sound image positioning of content of the left height channel signal, the right height channel signal, the left main channel signal, and the right main channel signal at a position in the height direction is effectively implemented, so that positioning of sound images of various sounds in the height direction may be adjusted as required, and positioning of various sounds and positioning of the picture may be integrated. For example, a sound image of an aircraft engine can be positioned above a display: a sound image of a person's dialog is positioned in the middle of the display, and a sound image of a footstep is positioned at a bottom of the display.

In another embodiment, according to the audio output method, the first audio information may be obtained only from the audio information, and the first audio information is output by using the first speaker.

In another embodiment, the audio output method may further be applied to the display device 100 shown in FIG. 14. The audio output method further includes: detecting an application environment of the display device, and obtaining a spatial parameter of the application environment. A sound emitting direction of the first speaker 31 changes in response to a change of the spatial parameter. In an embodiment, a distance detector 70 detects the spatial parameter of the application environment of the display device 100. The spatial parameter includes a plurality of parameters, for example, a first distance between the display device 100 and a wall, a second distance between the display device 100 and a ceiling, and a third distance between the display device and the user. A processor adjusts the sound emitting direction of the first speaker 31 in response to two or more parameters of the spatial parameter. In an embodiment, the processor may adjust the sound emitting direction of the first speaker 31 by controlling a driving component, so that the display device 100 can be used in a plurality of different application environments.

It may be understood that, according to the audio output method in an embodiment, the sound emitting direction of the first speaker 31 may be adjusted based on the application environment of the display device 100. When the display device 100 is used for the first time, or the display device 100 is moved to a new application environment, the display device 100 detects a spatial parameter of the application environment by using the distance detector 70. Then, the sound emitting direction of the first speaker 31 is adjusted by using the spatial parameter, so that the display device 100 can ensure that in different application environments, the first sound emitted by the first speaker 31 is accurately transmitted to the user viewing area after being reflected, to improve audio-visual experience of the user.

Certainly, in some embodiments, the spatial parameter of the application environment of the electronic device may alternatively be manually input by the user. For example, the user may perform input through a user input entry of the display device. The user input entry may be application software that is in a mobile phone and that interacts with the display device, or may be a setting window of the display device. The user fills in the spatial parameter such as the first distance, the second distance, or the third distance through the user input entry. The processor adjusts, in response to the spatial parameter input by the user, the sound emitting direction of the first speaker based on data filled in by the user. This method is less expensive than obtaining the spatial parameter by using the distance detector.

In some embodiments, according to the audio output method, a movement status of the display device 100 can further be sensed at all times. The movement status includes being moved and changes in position. After a position of the display device 100 changes, the distance detector 70 is triggered to detect the spatial parameter of the application environment, and the sound emitting direction of the first speaker 31 is adjusted based on the spatial parameter. Therefore, the distance detector 70 obtains the spatial parameter of the application environment provided that the position of the display device 100 changes, so that the first speaker 31 adjusts the sound emitting direction based on the spatial parameter, to ensure audio-visual experience of the user at all times.

In some embodiments, the audio output method further includes: The time difference between the first moment and the second moment changes in response to a change of the spatial parameter. In an embodiment, the processor may adjust the time difference between the first moment and the second moment based on the spatial parameters such as the first distance, the second distance, and the third distance, to ensure that the sound emitted by the first speaker and the sound emitted by the second speaker simultaneously arrive at the user viewing area. In this way, sound image positioning is more accurate. Certainly, in another embodiment, the time difference between the first moment and the second moment may further be obtained based on a path difference between a path along which the first sound emitted by the first speaker arrives at the user area and a path along which the second sound emitted by the second speaker arrives at the user area.

It may be understood that components that perform the operations of the audio output method are not limited to the foregoing described components, and may be any component that can perform the foregoing method.

It should be noted that embodiments in this application and the features in embodiments may be mutually combined in the case of no conflict.

The foregoing descriptions are merely some embodiments and implementations of this application, but the protection scope of this application is not limited thereto. Any variation or replacement readily figured out by one of ordinary skilled in the art within the technical scope disclosed in this application shall fall within the protection scope of this application. Therefore, the protection scope of this application shall be subject to the protection scope of the claims.

What is claimed is:

1. A display device, comprising:

a display, a first speaker disposed on a rear side of the display, wherein a sound emitting direction of the first speaker faces toward space in rear of and above the display device, a second speaker, wherein a sound emitting direction of the second speaker faces toward space in front of the display device or faces toward space below the display device, wherein the first speaker and the second speaker emit sounds asynchronously, the first speaker emits a first sound at a first moment, and the second speaker emits a second sound corresponding to the first sound at a second moment, and a distance detector configured to detect an application environment of the display device and obtain a spatial parameter of the application environment, wherein when the spatial parameter of the application environment of the display device changes, a time difference between the first moment and the second moment changes.

2. The display device according to claim 1, wherein the sound emitting direction of the first speaker is at an angle of 10 degrees to 80 degrees relative to a horizontal direction.

3. The display device according to claim 1, wherein the sound emitted by the first speaker is reflected by a first obstacle located in rear of the display device to a second obstacle located above the display device, and is reflected by the second obstacle to a user viewing area in front of the display device.

4. The display device according to claim 1, wherein the first sound mixes with the second sound in a user viewing area, wherein there is the time difference between the first moment and the second moment.

5. The display device according to claim 4, wherein when a volume ratio between the first sound and the second sound changes, a position of a sound image formed by the first sound and the second sound changes.

6. The display device according to claim 4, wherein the spatial parameter comprises at least one of a first distance, a second distance, and a third distance, the first distance is a distance between the display device and a first obstacle, the second distance is a distance between the display device and a second obstacle, and the third distance is a distance between the display device and a user.

7. The display device according to claim 4, further comprising:

a processor coupled to both the first speaker and the second speaker, wherein the processor is configured to control the first speaker to emit the first sound at the first moment, and control the second speaker to emit the second sound at the second moment.

8. The display device according to claim 7, wherein the processor is further configured to control a volume ratio between the first sound emitted by the first speaker and the second sound emitted by the second speaker.

9. The display device according to claim 1, wherein the sound emitting direction of the first speaker is variable.

10. The display device according to claim 9, wherein when a spatial parameter of the application environment of the display device changes, the sound emitting direction of the first speaker is variable.

11. The display device according to claim 1, wherein the sound emitting direction of the first speaker changes in response to the change of the spatial parameter.

12. The display device according to claim 11, wherein the distance detector is coupled to a processor, the distance detector sends an instruction to the processor, and the time difference between the first moment and the second moment changes in response to the instruction.

13. The display device according to claim 1, further comprising:

a top and a bottom, wherein the second speaker is disposed closer to the bottom compared with the first speaker.

14. An audio output method for a display device, comprising:

receiving, by a first speaker of the display device, first audio information, wherein the display device comprises a display, the first speaker, and a second speaker, wherein the first speaker emits a sound to space in rear of and above the display device, and wherein a sound emitting direction of the second speaker faces toward space in front of the display device or faces toward space below the display device;

receiving, by the second speaker, second audio information corresponding to the first audio information, wherein a play time of the first audio information is asynchronous with a play time of the second audio information;

emitting, by the first speaker, a first sound at a first moment after receiving the first audio information;

emitting, by the second speaker, a second sound corresponding to the first sound at a second moment after receiving the second audio information; and detecting an application environment of the display device, and obtaining a spatial parameter of the application environment, wherein when the spatial parameter of the application environment of the display device changes, a time difference between the first moment and the second moment changes.

15. The audio output method according to claim 14, wherein the sound emitted by the first speaker is reflected by a first obstacle located in rear of the display device to a second obstacle located above the display device, and is reflected by the second obstacle to a user viewing area in front of the display device.

16. The audio output method according to claim 14, the audio output method further comprising:

mixing with, by the first sound, the second sound in a user viewing area, wherein there is the time difference between the first moment and the second moment.

17. The audio output method according to claim 16, the wherein the time difference between the first moment and the second moment changes in response to a change of the spatial parameter.

18. The audio output method according to claim 14, wherein when a volume ratio between a first sound and a second sound changes, a position of a sound image formed by the first sound and the second sound changes.

19. The audio output method according to claim 14, wherein a sound emitting direction of the first speaker changes in response to a change of the spatial parameter.

* * * * *